US012712140B2

(12) United States Patent
Zhong et al.

(10) Patent No.: US 12,712,140 B2
(45) Date of Patent: Aug. 18, 2026

(54) MULTI-PHASE ELECTROMAGNETIC RELAY

(71) Applicant: Xiamen Hongfa Electric Power Controls Co., Ltd., Xiamen (CN)

(72) Inventors: Shuming Zhong, Xiamen (CN); Wenguang Dai, Xiamen (CN); Fangneng Li, Xiamen (CN); Jianfeng Yin, Xiamen (CN); Ziyu Jiang, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 255 days.

(21) Appl. No.: 18/571,454

(22) PCT Filed: Jun. 17, 2022

(86) PCT No.: PCT/CN2022/099486

§ 371 (c)(1),
(2) Date: Dec. 18, 2023

(87) PCT Pub. No.: WO2022/262851

PCT Pub. Date: Dec. 22, 2022

(65) Prior Publication Data

US 2024/0282539 A1 Aug. 22, 2024

(30) Foreign Application Priority Data

Jun. 18, 2021 (CN) ......................... 202110678844.1
Jun. 18, 2021 (CN) ......................... 202110680502.3
Jun. 18, 2021 (CN) ......................... 202121367443.6

(51) Int. Cl.
*H01H 50/54* (2006.01)
*H01H 50/02* (2006.01)
*H01H 50/14* (2006.01)

(52) U.S. Cl.
CPC ............ *H01H 50/54* (2013.01); *H01H 50/02* (2013.01); *H01H 50/14* (2013.01)

(58) Field of Classification Search
CPC ........ H01H 50/54; H01H 50/02; H01H 50/14; H01H 50/647; H01H 2050/166;
(Continued)

(56) References Cited

U.S. PATENT DOCUMENTS 11,657,995 B2 * 5/2023 Nishida .................. H01H 9/443 335/2
2006/0066425 A1 * 3/2006 Gruner .................. H01H 50/54 335/128

(Continued)

FOREIGN PATENT DOCUMENTS

CN 201336253 Y 10/2009
CN 201800200 U 4/2011

(Continued)

OTHER PUBLICATIONS

Multi-Phase Electromagnetic Relay.*

(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

A multi-phase electromagnetic relay includes a base, lead-out structures and movable-static contact matching structures. Each of lead-out structures includes an input terminal and an output terminal. One movable-static contact matching structure is provided between the input and the output terminals in each of the plurality of lead-out structures. The input and output terminals are respectively led out from the first and second side walls of the base. The input and output terminals bent to the outside of the third side wall of the (Continued)

base, and in a non-crossed and spaced manner. The external connection ends of the input and output terminals are outside the third side wall and are arranged a row parallel to the third side wall. The input and output terminals are respectively arranged at corresponding positions on two sides of the same row. The third side wall is connected between the first and second side walls.

20 Claims, 16 Drawing Sheets

(58) Field of Classification Search
CPC ...... H01H 50/002; H01H 50/24; H01H 50/56; H01H 51/2227
USPC .......................................................... 335/185
See application file for complete search history.

(56) References Cited

U.S. PATENT DOCUMENTS

| | | | | |
|---|---|---|---|---|
| 2009/0318000 | A1 | 12/2009 | Connell | |
| 2020/0235558 | A1* | 7/2020 | Hass | H01L 23/62 |
| 2022/0051863 | A1* | 2/2022 | Otsuka | H01H 50/38 |
| 2024/0347300 | A1* | 10/2024 | Dai | H01H 50/14 |
| 2024/0347302 | A1* | 10/2024 | Wang | H01H 50/546 |
| 2024/0387137 | A1* | 11/2024 | Dai | H01H 50/58 |
| 2025/0095936 | A1* | 3/2025 | Dai | H01H 50/546 |
| 2025/0095939 | A1* | 3/2025 | Zhong | H01H 1/54 |

FOREIGN PATENT DOCUMENTS

| | | | | |
|---|---|---|---|---|
| CN | 103367046 A | | 10/2013 | |
| CN | 203339071 U | | 12/2013 | |
| CN | 104091725 A | | 10/2014 | |
| CN | 106971913 A | | 7/2017 | |
| CN | 207116337 U | | 3/2018 | |
| CN | 208225812 U | | 12/2018 | |
| CN | 109449053 A | | 3/2019 | |
| CN | 208722815 U | | 4/2019 | |
| CN | 110033994 A | | 7/2019 | |
| CN | 110335781 A | | 10/2019 | |
| CN | 209993533 U | | 1/2020 | |
| CN | 209993553 U | | 1/2020 | |
| CN | 211320019 U | | 8/2020 | |
| CN | 111710563 A | | 9/2020 | |
| CN | 212209359 U | | 12/2020 | |
| CN | 212461530 U | | 2/2021 | |
| CN | 113394057 A | | 9/2021 | |
| CN | 113611575 A | * | 11/2021 | H01H 50/60 |
| CN | 215118785 U | | 12/2021 | |
| CN | 215118786 U | | 12/2021 | |
| CN | 115497772 A | * | 12/2022 | H01H 50/56 |
| CN | 110335781 B | | 9/2024 | |
| EP | 3547344 A1 | | 10/2019 | |
| EP | 3608938 A1 | | 2/2020 | |
| JP | S55131933 A | | 10/1980 | |
| JP | 2000243473 A | | 9/2000 | |
| JP | 2007018914 A | | 1/2007 | |
| JP | 2014505345 A | | 2/2014 | |
| JP | 2016012447 A | | 1/2016 | |
| JP | 2019032947 A | | 2/2019 | |
| WO | 2019026947 A1 | | 2/2019 | |

OTHER PUBLICATIONS

Extended European Patent Office Search Report for EP25190651.7; mailed Aug. 20, 2025; 6 pages.
Extended European Patent Office Search Report; EP25190650.9; mailed Aug. 20, 2025; 9 pages.
CN office action; Application No. 202210970467.3; dtd: May 20, 2025; English Translation; 14 pages.
Translated International Search Report for International Application No. PCT/CN2022/099486, International Filing Date Jun. 17, 2022, Date of Mailing Sep. 2, 2022, 2 pages.
Extended European Search Report for European Application No. 22824323.4 dated Sep. 11, 2024, 5 pages.
CN office action; Application No. 202210970467.3; dtd: 22026-03-17; English Translation; 17 pages.

* cited by examiner

MULTI-PHASE ELECTROMAGNETIC RELAY

CROSS REFERENCE

The present application is a national stage of International PCT Application No. PCT/CN2022/099486, filed on Jun. 17, 2022, which is based upon and claims priority to Chinese Patent Application No. 202110680502.3, 202110678844.1 and 202121367443.6 filed on Jun. 18, 2021, and the entire contents thereof are incorporated herein by reference.

TECHNICAL FIELD

The present disclosure relates to the technical field of electric power, in particular to a multi-phase electromagnetic relay.

BACKGROUND

The multi-phase electro-magnetic relay is mainly used in power system, which is to turn on or off the power supply of the load through two or more sets of movable-static contact piece assemblies. The three-phase electromagnetic relay, for example, has three sets of contact parts composed of three sets of movable-static contact piece assemblies, which can control the three-phase electricity of the load on or off. The multi-phase electromagnetic relay usually includes a base and a plurality of lead-out structures from the inside out of the base, each of the plurality of lead-out structures includes an input terminal and an output terminal, the input terminal and the output terminal of each of the plurality of lead-out structures communicates with corresponding movable-static contact matching structure in the base. When the movable contact is in contact with the static contact in one movable-static contact matching structure, the input terminal and the output terminal in corresponding lead-out structure communicates with each other. When the movable contact is separated from the static contact in one movable-static contact matching structure, the input terminal and the output terminal are not communicated with each other.

The multi-phase electromagnetic relay in the prior art, the input terminal and the output terminal in one lead-out structure are usually led out from the base adjacent to each other. Due to the need of external wires arrangement, For example, the three-phase electromagnetic relay needs one-input and eight-output wiring, which leads some of the input terminals or the output terminals to be led out across the input terminals or the output terminals of other paths, so that some of the input terminals and the output terminals are crossed. The plurality of lead-out structures are crossed in the existing multi-phase electromagnetic relay, which has many problems, such as high copper consumption (the lead-out structure is made of copper material), high cost, complicated copper molding, complicated assembly and spot-welding processes, and hidden dangers of safe distance between strong electricity. In addition, the input terminal and the output terminal in existing multi-phase electromagnetic relay adopts static contact piece and movable contact piece as lead-out pieces, and the movable-static contact piece assembly inside the relay forms a Z-shaped structure, which also causes the disadvantages of high copper consumption and high cost.

SUMMARY

According to one aspect of present disclosure, a multi-phase electromagnetic relay includes a base, a plurality of lead-out structures led out from the inside out of the base and a plurality of movable-static contact matching structures installed inside the base, each of the plurality of lead-out structures respectively includes an input terminal and an output terminal, one movable-static contact matching structure is provided between the input terminal and the output terminal in each of the plurality of lead-out structures. The base is a cuboid. The input terminals are led out from the first side wall of four side walls of the base. The output terminals are led out from the second side wall of four side walls of the base. The second side wall and the first side wall are oppositely disposed; The input terminal and the output terminal outside the base bent to the outside of the third side wall of the base, and in a non-crossed and spaced manner. The external connection ends of the input terminals and the output terminals are outside the third side wall and are arranged a row parallel to the third side wall. The input terminal and the output terminal are respectively arranged at corresponding positions on two sides of the same row. The third side wall is connected between the first side wall and the second side wall.

According to an embodiment of present disclosure, an external connection end of a neutral input terminal and an external connection end of a neutral output terminal are provided between the external connection end of the input terminal and the external connection end of the output terminal, the external connection end of the neutral input terminal and the external connection end of the neutral output terminal are connected by an electrical connecting piece.

According to an embodiment of present disclosure, the external connection end is provided with an external connector, the external connector includes at least one ring terminal and a solder sheet, the at least one ring terminal is movably adapted to one end of the solder sheet, the other end of the solder sheet is welded with corresponding one of the input terminal, the output terminal and the electrical connecting piece, the ring terminal is adapted with a screw.

According to an embodiment of present disclosure, both the input terminal and the output terminal are in sheet structure, the input terminals and the output terminals includes a first portion protruding from the inside of the base in a manner perpendicular to the side wall of the base and a second portion bent and connected with the first portion, the external connection end is located in the second portion.

According to an embodiment of present disclosure, the first portion and the second portion are integrally connected at the bend.

According to an embodiment of present disclosure, the first portion and the second portion are two independent parts, the first part and the second part are welded.

According to an embodiment of present disclosure, the second portion of the input terminal includes a splitter sheet used for collecting current signals.

According to an embodiment of present disclosure, the movable-static contact matching structure comprises a first static contact piece, a first static contact, a first movable contact piece, a first movable contact, a second static contact piece, a second static contact, a second movable contact piece, and a second movable contact; The first static contact is fixedly connected to one end of the first static contact piece and one end of the first movable contact piece, the first movable contact is fixedly connected to other end of the first movable contact piece, the second static contact is fixedly connected to one end of the second static contact piece and one end of the second movable contact piece, the second movable contact is fixedly connected to other end of the second movable contact piece; The first static contact cooperates with the second movable contact, the second static contact cooperates with the first movable contact, the first static contact piece is used as the input terminal, the second static contact piece is used as the output terminal.

According to an embodiment of present disclosure, wherein a plurality of slots are respectively defined in the first side wall and the second side wall of the base, the first static contact pieces are respectively inserted in the slots of the first side wall, and one end of the first static contact piece is closer to the first side wall than the second side wall; The second static contact piece are respectively inserted in the slots of the second side wall, and one end of the second static contact piece is closer to the second side wall than the first side wall.

According to an embodiment of present disclosure, wherein the first movable contact piece and the second movable contact piece are approximately parallel, the first movable contact piece and the second movable contact piece are respectively formed by a plurality of contact pieces stacked together; The first movable contact piece is provided with a first bending portion protruding toward the second movable contact piece, the second movable contact piece is provided with a second bending portion protruding toward the first movable contact piece, and the first bending portion and the second bending portion are disposed in a staggered manner.

According to an embodiment of present disclosure, wherein the multi-phase electromagnetic relay further comprising a magnetic circuit part and a push card; The base is divided into upper layer and lower layer by a partition located in a middle position in a thickness direction; The magnetic circuit part is installed on the upper layer of the base; The movable static contact matching structure is installed on the lower layer of the base; The magnetic circuit part comprises a armature assembly, the armature assembly is provided with a push arm, the push arm passes through the partition to the lower layer of the base and is cooperated with movable contact piece of the movable static contact matching structure through the push card.

A multi-phase electromagnetic relay including a plurality of lead-out structures, each of the plurality of lead-out structures including an input terminal and an output terminal, and a plurality of movable-static contact matching structure, respectively provided between the input terminal and the output terminal of each of the movable-static contact matching structures. Wherein all the plurality of input terminals are arranged on one side of the movable-static contact matching structures, and all the plurality of output terminals are arranged on the other side of the movable-static contact matching structures. The plurality of input terminals are spaced from each other, and are not crossing, the plurality of output terminals are spaced from each other, and are not crossing, the plurality of input terminals and the plurality of output terminals are spaced from each other, and are not crossing, external connection ends of the plurality of input terminals and the plurality of output terminals both extend in a same direction, both the external connection end of the input terminal and the external connection end of the output terminal of each of the plurality of lead-out structures are oppositely disposed on two sides of the movable-static contact matching structure.

According to an embodiment of present disclosure, wherein the external connection ends of the plurality of input terminals and the external connection ends of the plurality of output terminals are arranged in a row.

According to an embodiment of present disclosure, wherein the plurality of input terminals and the plurality of output terminals oppositely disposed, the plurality of input terminals and the plurality of output terminals respectively include an L-shaped body including a first portion and a second portion, one end of the second portion constitutes the external connection end.

According to an embodiment of present disclosure, wherein the body is of a sheet structure.

According to an embodiment of present disclosure, wherein the first portion and the second portion are integrated.

According to an embodiment of present disclosure, wherein the first portion and the second portion are two independent parts, and fixed together by welding.

According to an embodiment of present disclosure, wherein the second portion of the input terminal includes a splitter sheet for collecting current signals.

According to an embodiment of present disclosure, wherein an external connection end of a neutral input terminal and an external connection end of a neutral output terminal are provided between the external connection ends of the plurality of input terminals and the external connection ends of the plurality of output terminals, the external connection end of the neutral input terminal and the external connection end of the neutral output terminal are connected by an electrical connecting piece.

According to an embodiment of present disclosure, wherein the external connection ends of the plurality of input terminals, the external connection ends of the plurality of output terminals, the external connection end of the neutral input terminal, and the external connection end of the neutral output terminal are arranged in a row.

According to an embodiment of present disclosure, the relay further includes a plurality of external connectors, the plurality of external connectors are respectively disposed on the external connection ends of the plurality of input terminals and the external connection ends of the plurality of output terminals.

According to an embodiment of present disclosure, wherein each of the plurality of the external connectors includes a solder sheet, at least one ring terminal and at least one screw that matches the least one of ring terminal, the solder sheet is welded to the input terminal or the output terminal at one end, the at least one ring terminal is movably adapted to other end of the solder sheet.

According to an embodiment of present disclosure, wherein each of the plurality of the external connectors includes at least one ring terminal and at least one screw that matches the least one of ring terminal, a plurality of the ring terminals of the plurality of the plurality of external connectors are respectively movably adapted to the plurality of the external connection ends.

According to an embodiment of present disclosure, wherein the movable-static contact matching structure includes a first static contact piece, a first static contact, a first movable contact piece, a first movable contact, a second static contact piece, a second static contact, a second movable contact piece, and a second movable contact; The first static contact is fixedly connected to one end of the first static contact piece and one end of the first movable contact piece, the first movable contact is fixedly connected to other end of the first movable contact piece, the second static contact is fixedly connected to one end of the second static contact piece and one end of the second movable contact piece, the second movable contact is fixedly connected to other end of the second movable contact piece; The first static contact cooperates with the second movable contact, the second static contact cooperates with the first movable contact, the first static contact piece is used as the input terminal, the second static contact piece is used as the output terminal.

According to an embodiment of present disclosure, wherein the first movable contact piece and the second movable contact piece are approximately parallel, the first movable contact piece and the second movable contact piece are respectively formed by a plurality of contact pieces stacked together; The first movable contact piece is provided with a first bending portion protruding toward the second movable contact piece, the second movable contact piece is provided with a second bending portion protruding toward the first movable contact piece, and the first bending portion and the second bending portion are disposed in a staggered manner.

According to an embodiment of present disclosure, wherein further including a base, the input terminal and the output terminal are respectively led out from two opposite sides of the base, the external connection end is located outside the base.

According to an embodiment of present disclosure, wherein the multi-phase electromagnetic relay further including a magnetic circuit part and a push card; The base is divided into upper layer and lower layer by a partition located in a middle position in a thickness direction; The magnetic circuit part is installed on the upper layer of the base; The movable static contact matching structure is installed on the lower layer of the base; The magnetic circuit part includes a armature assembly, the armature assembly is provided with a push arm, the push arm passes through the partition to the lower layer of the base and is cooperated with movable contact piece of the movable static contact matching structure through the push card.

According to an embodiment of present disclosure, wherein the base is a cuboid including a first side wall and a second side wall oppositely arranged, and a third side wall connecting between the first side wall and the second side wall, the input terminal is led out perpendicular to the first side wall and extends in the direction toward the third side wall after bending, the output terminal is led out perpendicular to the second side wall and extends in the direction toward the third side wall after bending, the plurality of the external connection ends are arranged in a row parallel to the third side wall.

According to an embodiment of present disclosure, wherein a plurality of slots are respectively defined in the first side wall and the second side wall of the base. The movable-static contact matching structure includes a first static contact piece, a first static contact, a first movable contact piece, a first movable contact, a second static contact piece, a second static contact, a second movable contact piece, and a second movable contact; The first static contact is fixedly connected to one end of the first static contact piece and one end of the first movable contact piece, the first movable contact is fixedly connected to other end of the first movable contact piece, the second static contact is fixedly connected to one end of the second static contact piece and one end of the second movable contact piece, the second movable contact is fixedly connected to other end of the second movable contact piece; The first static contact cooperates with the second movable contact, the second static contact cooperates with the first movable contact, the first static contact piece is used as the input terminal, the second static contact piece is used as the output terminal. The first static contact pieces are respectively inserted in the slots of the first side wall, and one end of the first static contact piece is closer to the first side wall than the second side wall; The second static contact piece are respectively inserted in the slots of the second side wall, and one end of the second static contact piece is closer to the second side wall than the first side wall.

The present disclosure will be further described in detail with reference to the drawings and the embodiments, and the above purpose, r features and advantages of the present disclosure will become more apparent.

BRIEF DESCRIPTION OF THE DRAWINGS

The above and other features and advantages of the present disclosure will become more apparent by the detailed description of the exemplary embodiments thereof with reference to the accompanying drawings.

DETAILED DESCRIPTION

Figure 1:
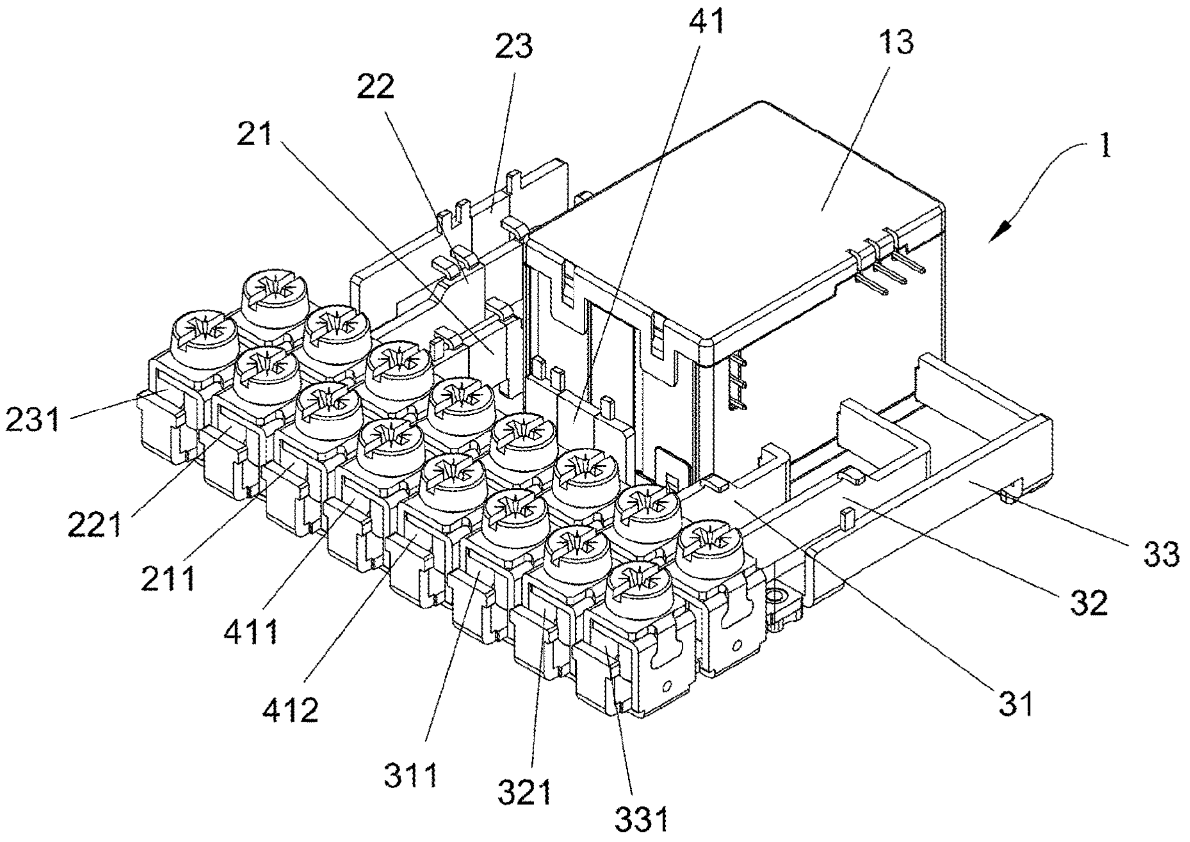
FIG. 1 is a schematic diagram of a three-dimensional structure of an embodiment of the multi-phase electromagnetic relay of the present disclosure.

Now, the exemplary implementations will be described more completely with reference to the accompanying drawings. However, the exemplary implementations can be implemented in various forms and should not be construed as limiting the implementations as set forth herein. Although terms having opposite meanings such as “up” and “down” are used herein to describe the relationship of one component relative to another component, such terms are used herein only for the sake of convenience, for example, “in the direction illustrated in the figure”. It can be understood that if a device denoted in the drawings is turned upside down, a component described as “above” something will become a component described as “under” something. When a structure is described as “above” another structure, it probably means that the structure is integrally formed on another structure, or, the structure is “directly” disposed on another structure, or, the structure is “indirectly” disposed on another structure through an additional structure.

Words such as “one”, “an/a”, “the” and “said” are used herein to indicate the presence of one or more elements/component parts/and others. Terms “including”, “comprising” and “having” have an inclusive meaning which means that there may be additional elements/component parts/and others in addition to the listed elements/component parts/and others. Terms “first”, “second” and “third” are used herein only as markers, and they do not limit the number of objects modified after them.

As shown in FIG. 1 to FIG. 12, the multi-phase electromagnetic relay of the present disclosure includes a base 1, a plurality of lead-out structures led out from the inside of the base and a plurality of the movable-static contact matching structures installed in the base. Each of the pluralism of lead-out structure includes one input terminal and one output terminal, and one movable-static contact matching structure is matched between the input terminal and the output terminal in the same path.

This embodiment is a three-phase electromagnetic relay used to control the three-phase power supply in the power system, which includes three input terminals 21, 22, 23 and three output terminals 31, 32, 33. Wherein the input terminal 21 and the output terminal 31 belong to the same road, the input terminal 22 and the output terminal 32 belong to the same road, and the input terminal 23 and the output terminal 33 belong to the same road.

Figure 3:
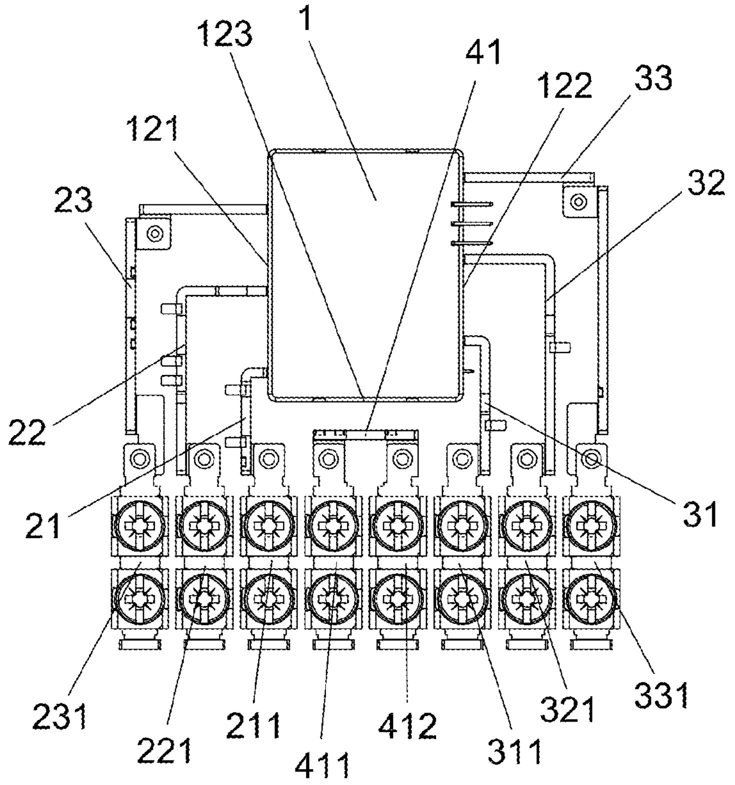
FIG. 3 is a top view of FIG. 1.
Figure 5:
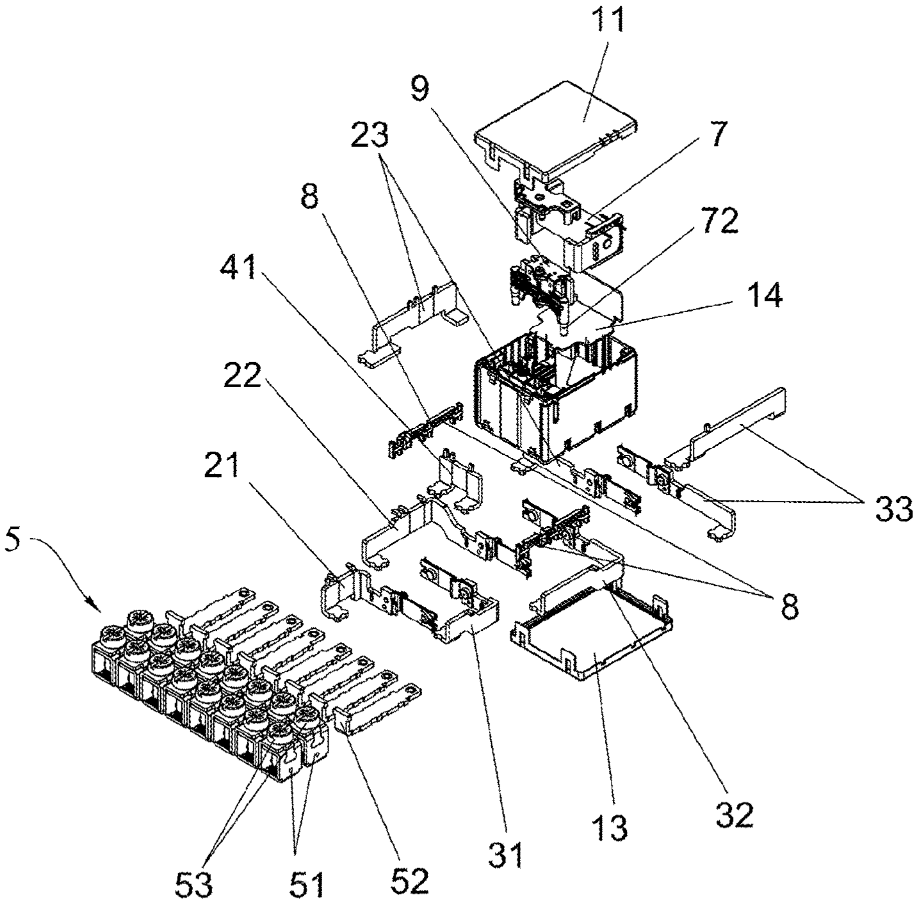
FIG. 5 is an exploded schematic view of a three-dimensional structure in an embodiment of the present disclosure.

As shown in FIG. 1, FIG. 3 and FIG. 5, the base 1 is a cuboid, which includes an upper housing 11, a lower housing 13 and the four side walls connected between the upper housing 11 and the lower housing 13. The four side walls are the first side wall 121, the second side wall 122, the third side wall 123 and the fourth side wall. Wherein the first side wall 121 and the second side wall 122 are disposed oppositely. The three input terminals 21, 22, 23 are led out from the first side wall 121 of the base 1 and bent to the third side wall 123. The three input terminals 21, 22, 23 are spaced from each other and are not crossing with each other. Each of the input terminals is provided with an external connection end at one end; The three output terminals 31, 32, 33 are led out from the second side wall 122 of the base, and bent to the third side wall 123. The three output terminals 31, 32, 33 are spaced from each other and are not crossing with each other. Each of the output terminals is provided with an external connection end at one end. The external connection ends 211, 221, 231 of three input terminals 21, 22, 23 and the external connection ends 311, 321, 331 of the three output terminals 31, 32, 33 are outside of the third side wall 123 and arranged in a row parallel to the third side wall 123. The input terminal and the output terminal in the same path are symmetrically arranged. As shown in FIG. 3, The input terminal 23 in the first position on the left and the output terminal 33 in the first position on the right belong to the same path, the input terminal 22 in the second position on the left and the output terminal 32 in the second position on the right belong to the same path, and the input terminal 21 in the third position on the left and the output terminal 31 in the third position on the right belong to the same path.

In this embodiment, an external connection end 411 of the neutral input terminal and an external connection end 412 of the neutral output terminal are provided between the external connection ends 211, 221, 231 of three input terminals 21, 22, 23 and the external connection ends 311, 321, 331 of three output terminals 31, 32, 33. The external connection end 411 of the neutral input terminal and the external connection end 412 of the neutral output terminal are connected by the electrical connecting piece 41.

Figure 2:
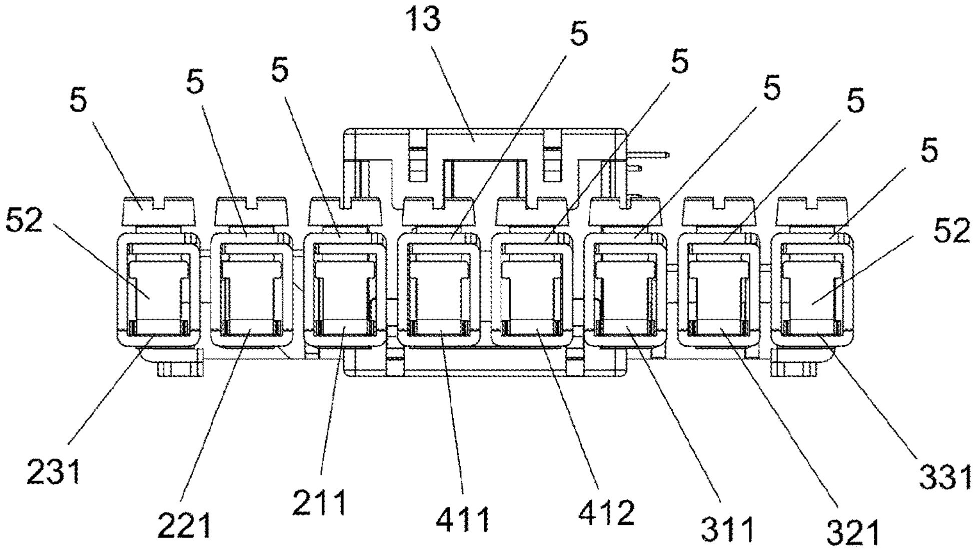
FIG. 2 is a front view of FIG. 1.
Figure 4:
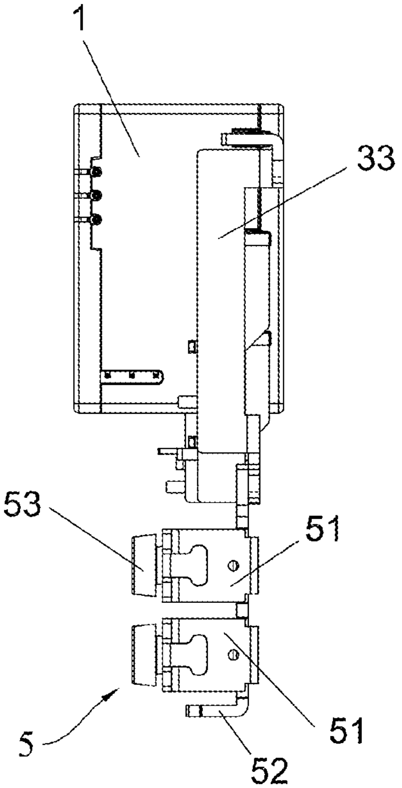
FIG. 4 is a side view of FIG. 1.

As shown in FIGS. 2 and 4, in this embodiment, the external connection end is provided with an external connector, the external connectors 5 on the external connection ends (including the external connection end 211, 221, 231 of three input terminals 21, 22, 23, the external connection end 311, 321, 331 of three output terminals 31, 32, 33, the external connection end 411 of the neutral input terminal, and the external connection end of the neutral output terminal) are all adopt the same structure.

in this embodiment, the external connector 5 includes two ring terminals 51 and one solder sheet 52, two ring terminals 51 are movably adapted to one end of the solder sheet 52. The other end of the solder sheet 52 are welded to corresponding one of the input terminals, the output terminal and electrical connecting piece. For example, the other end of the solder sheet 52 of the external connector 5 for the input terminal is welded to the input terminal, the other end of the solder sheet 52 of the external connector 5 for the output terminal is welded with the output terminal, The other end of the solder sheet 52 of the external connector 5 for the input terminal is welded with the input terminal, The other end of the solder sheet 52 of the external connector 5 for the neutral input terminal and the neutral output terminal is soldered to the electrical connecting piece 41. The ring terminal 51 is also equipped with a screw 53, and the external wiring is fixed at one end of the solder sheet 52 through the screw, so that the ring terminal 51 is also fixed.

Figure 7:
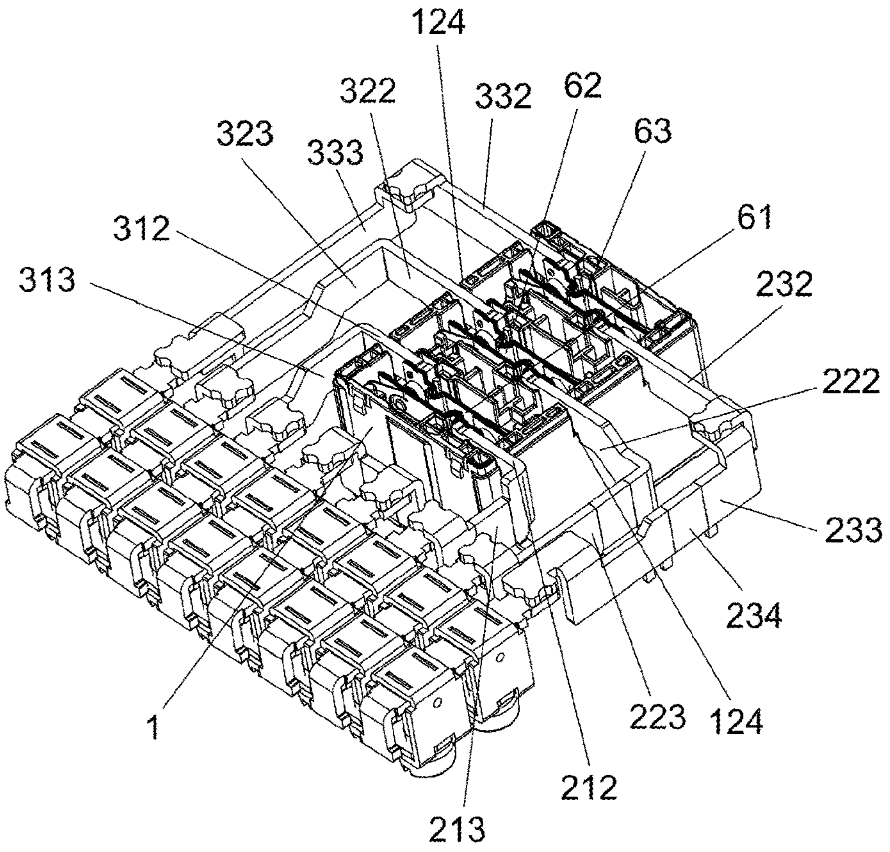
FIG. 7 is a schematic view of a three-dimensional structure in an embodiment of the present disclosure (with the bottom facing upward and the lower housing removed)

As shown in FIG. 5 and FIG. 7, the three input terminals 21, 22 and 23 and the three output terminals 31, 32 and 33 are all sheet structures. The input terminal and the output terminal respectively include a first portion extending outward from the inside of the base in a manner perpendicular to the side wall of the base and a second portion bent and connected with the first portion, the external connection end is located on the second portion. Specifically, the input terminal 21 includes the first portion 212 that extends from the inside of the base in a manner perpendicular to the first side wall 121 of the base and the second portion 213 bent and connected with the first part 212. The external connection end 211 is located on the second portion 213; The input terminal 22 includes the first portion 222 that extends from the inside of the base in a manner perpendicular to the first side wall 121 and the second portion 223 bent and connected with the first portion 222 the external connection end 221 is located on the second portion 223; The input terminal 23 includes the first portion 232 that extends from the inside of the base in a manner perpendicular to the first side wall 121 and the second portion 233 bent and connected with the first portion 232 the external connection end 231 is located on the second portion 233; The output terminal 31 includes the first portion 312 that extends from the inside of the base in a manner perpendicular to the second side wall 122 and the second portion 313 bent and connected with the first portion 312 the external connection end 311 is located on the second portion 313; The output terminal 32 includes the first portion 322 that extends from the inside of the base in a manner perpendicular to the second side wall 122 and the second portion 323 bent and connected with the first portion 322, the external connection end 321 is located on the second portion 323; The output terminal 33 includes the first portion 332 that extends from the inside of the base in a manner perpendicular to the second side wall 122 and the second portion 333 bent and connected with the first portion 332, the external connection end 331 is located on the second portion 333.

In this embodiment, the first part 212 and the second part 213 of the input terminal 21 are integrated; The first portion 222 and the second portion 223 of the input terminal 22 are integrated; The first port 232 and the second port 233 of the input terminal 23 are two independent parts, and the first port 232 and the second port 233 are welded at the bend; The first portion 312 and the second portion 313 of the output terminal 31 are integrally connected at the bend; The first portion 322 of the output terminal 32 and the second portion 323 are integrally connected at the bend; The first port 332 and the second port 333 of the output terminal 33 are two independent parts, and the first port 332 and the second port 333 are welded at the bend.

Figure 6:
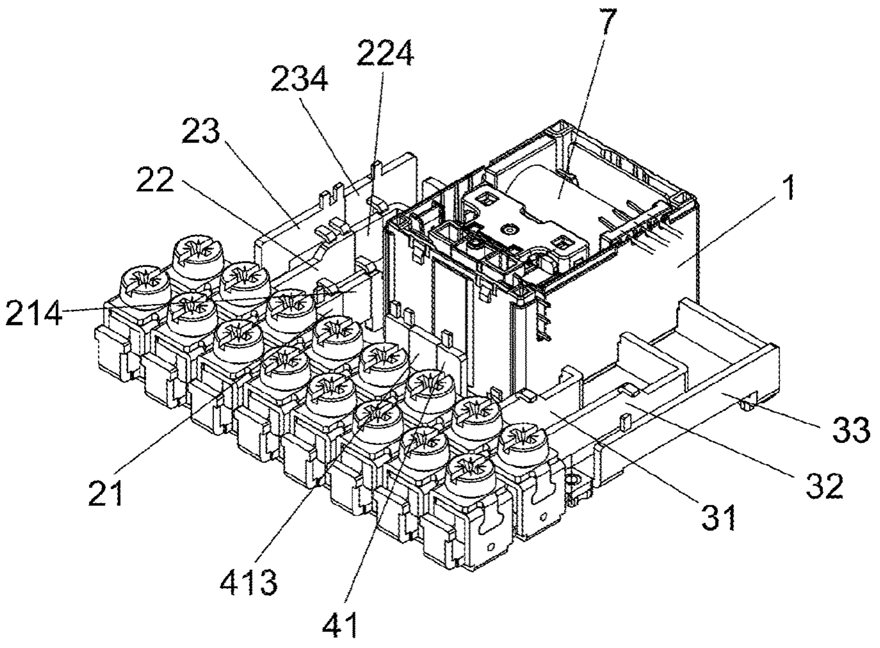
FIG. 6 is a schematic view of a three-dimensional structure in an embodiment of the present disclosure (with the upper housing removed)

As shown in FIG. 6, the second portion 213, 223 and 233 of three input terminals 21, 22 and 23 include splitter sheets 214, 224 and 234 for collecting current signals. The splitter sheet 413 for collecting current signals is also provided on the electrical connecting piece 41.

Figure 11:
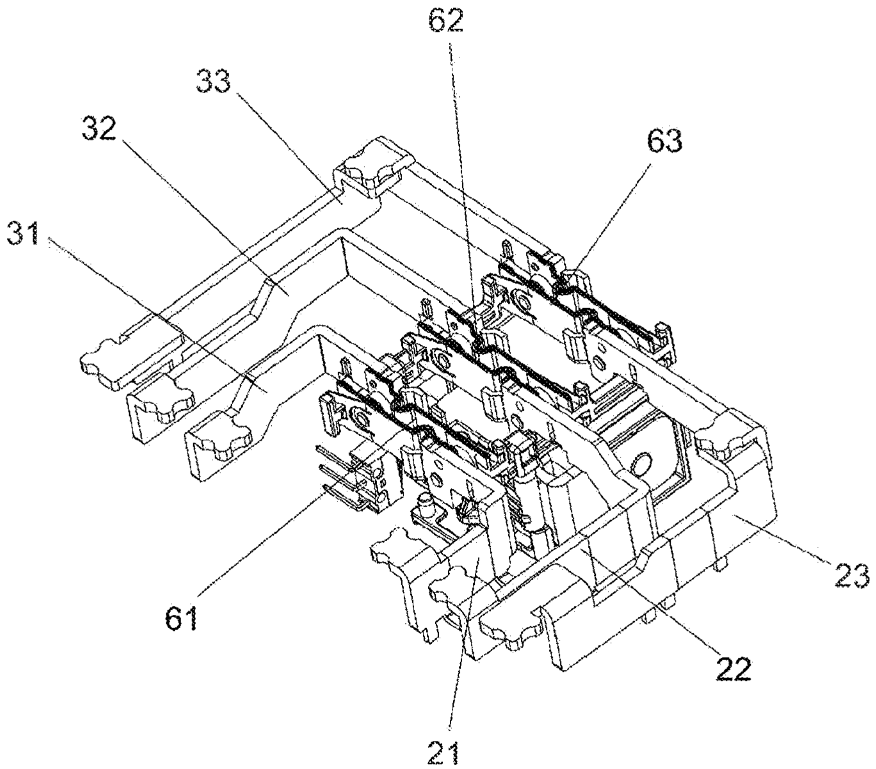
FIG. 11 is a schematic diagram of the cooperation of the movable-static contact matching structure, the magnetic circuit part and the push card in the embodiment of the present disclosure (bottom up)

As shown in FIG. 7 and FIG. 11, the three movable-static contact matching structures 61, 62 and 63 corresponding to the three input terminals 21, 22 and 23 and the three output terminals 31, 32 and 33 are all the same in structure.

Figure 8:
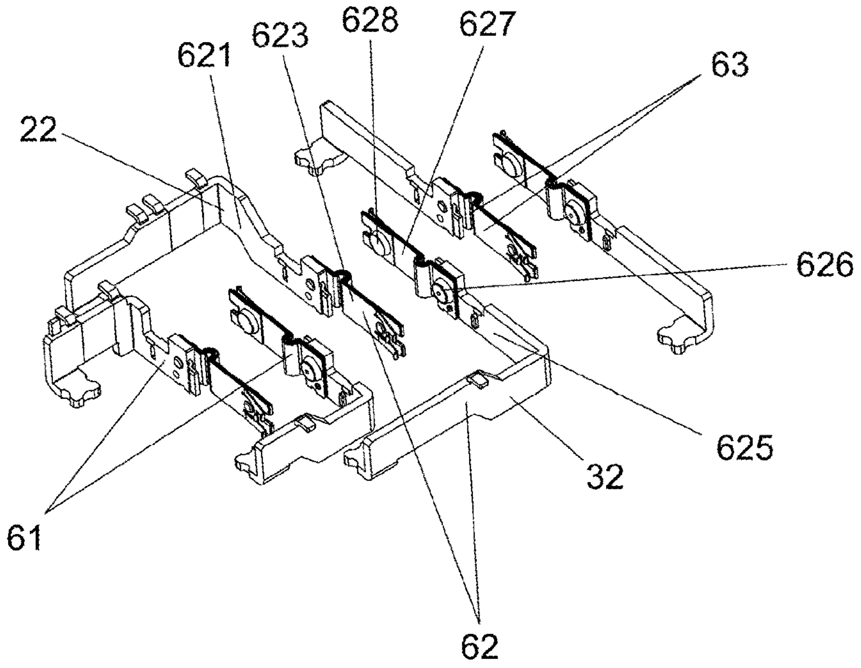
FIG. 8 is a schematic view of the movable-static contact matching structure in an embodiment of the present disclosure.
Figure 9:
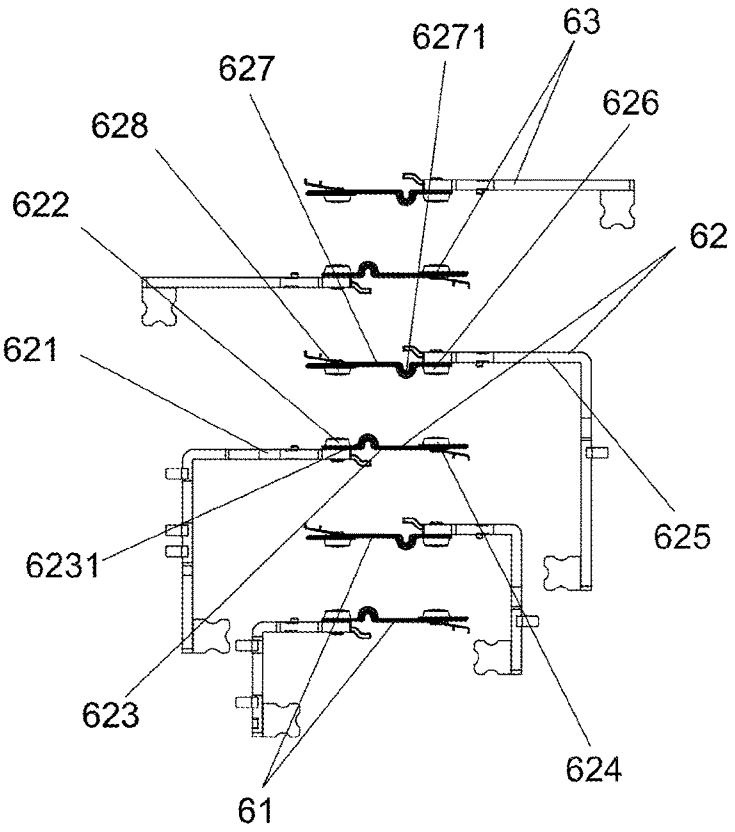
FIG. 9 is a top view of the movable-static contact matching structure in the embodiment of the present disclosure.
Figure 10:
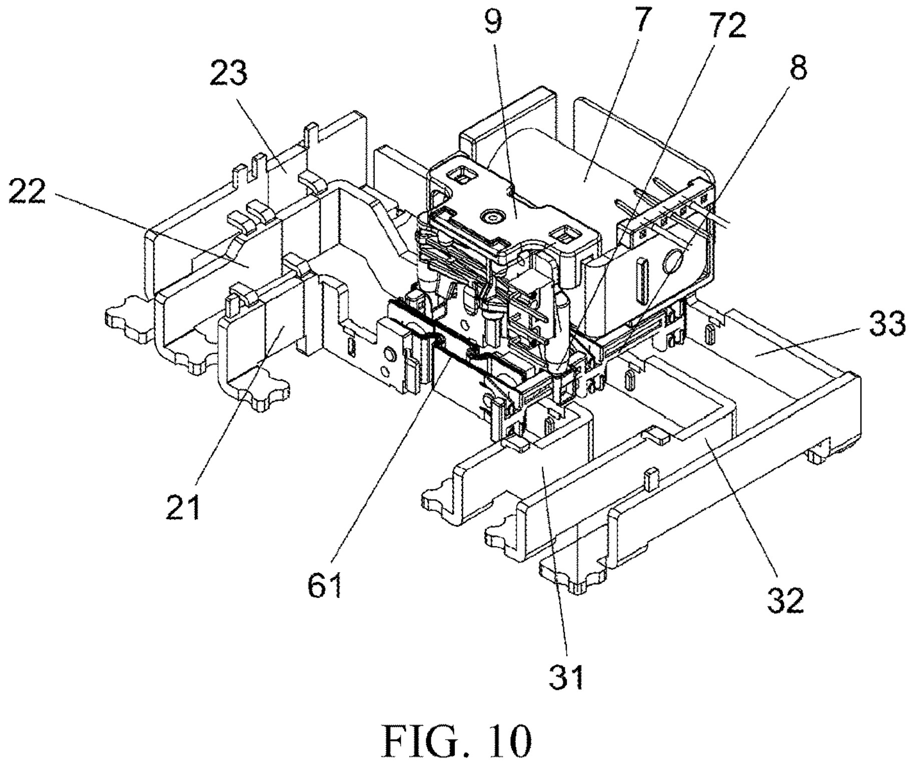
FIG. 10 is a schematic diagram of the cooperation between the movable-static contact matching structure, the magnetic circuit part and the push card in the embodiment of the present disclosure.

As shown in FIG. 8 and FIG. 9, the movable-static contact matching structure 62 corresponding to the input terminal 22 and the output terminal 32 is taken as an example to explain the movable-static contact matching structure. The movable-static contact matching structure 62 includes a first static contact piece 621, a first static contact 622, a first movable contact piece 623, a first movable contact 624, a second static contact piece 625, a second static contact 626, a second movable contact piece 627 and a second movable contact 628. The first static contact 622 is fixed to one end of the first static contact piece 621 and one end of the first movable contact piece 623, the first movable contact 624 is fixed to the other end of the first movable contact piece 623, the second static contact 626 is fixed to one end of the second static contact piece 625 and one end of the second movable contact piece 627, the second movable contact 628 is fixed to the other end of the second movable contact piece 627; The first static contact 622 cooperates with the second movable contact 628, the second static contact 626 cooperates with the first movable contact 624; The first static contact piece 621 is used as the input terminal 22, the second static contact piece 625 is used as the output terminal 32.

As shown in FIG. 7, the first side wall 121 and the second side wall 122 of the base 1 are respectively provided with three slots 124; The first static contact piece (corresponding to the input terminal) is inserted into the slot 124 of the first side wall 121 of the base 1, and one end of the first static contact piece is closer to the first side wall than the second side wall. Each of the second static contact pieces (corresponding to the output terminal) is inserted into the slot 124 of the second side wall 122 of the base 1, And one end of the second static contact piece is closer to the second side wall than the first side wall.

Figure 12:
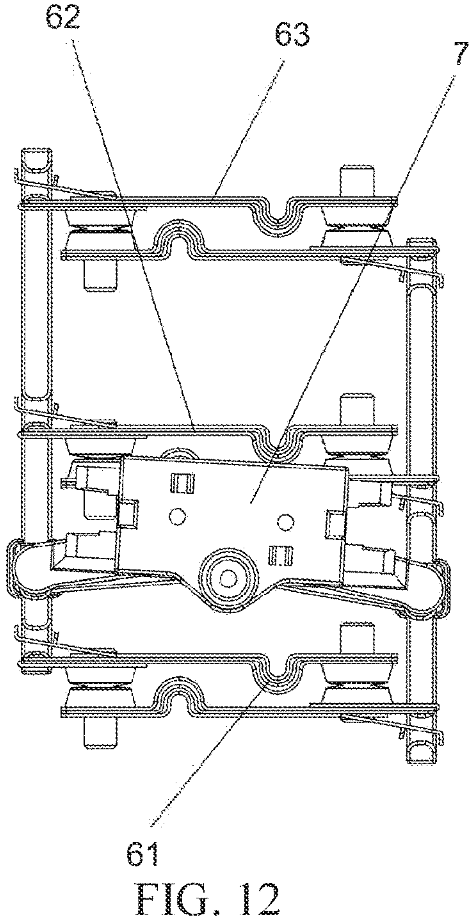
FIG. 12 is a schematic diagram of the cooperation of the movable contact piece, the push card and the armature assembly in the embodiment of the present disclosure.

As shown in FIG. 9 and FIG. 12, taking the movable-static contact matching structure 62 corresponding to the input terminal 22 and the output terminal 32 as an example, The first movable contact piece 623 and the second movable contact piece 627 are roughly parallel, and the first movable contact piece 623 and the second movable contact piece 627 are respectively composed of a plurality of contact pieces stacked together; The first movable contact piece 623 is provided with a first bending portion 6231 protruding in the direction of the second movable contact piece. The second movable contact piece 627 is provided with a second bending portion 6271 protruding in the direction of the first movable contact piece, and the first bending portion 6231 and the second bending portion 6271 are staggered.

As shown in FIG. 5, the multi-phase electro-magnetic relay in this embodiment further includes a magnetic circuit part 7 and a push card 8. The base 1 is provided with a partition 14 at the middle position in the thickness direction to divide the base 1 into an upper layer and a lower layer. The magnetic circuit part 7 is installed on the upper layer of the base 1; The movable-static contact matching structure is installed in the lower layer of the base 1. The magnetic circuit part 7 includes an armature assembly 9, which is provided with a push arm 72. The push arm 72 passes through the lower layer of the partition 14 to the base 1, and cooperates with the movable contact piece in the movable-static contact matching structure through the push card 8, and there are two push cards 8 in this embodiment.

In the multi-phase electro-magnetic relay of the present disclosure, the input terminal 21, 22 and 23 are respectively led out from the first side wall 121 in the four side walls of the base 1, The output terminals 31, 32 and 33 are respectively led out from the second side wall 122 of the base 1, and the second side wall 122 is opposite to the first side wall 121; The input terminals 21, 22, and 23 and the output terminals 31, 32, and 33 are respectively bent and extended to the outside of the third side wall 123 of the base and spaced with each other, without crossing. The external connection ends 211, 221 and 231 of the input terminals 21, 22 and 23 and the external connection ends 311 and 321 of the output terminals 31, 32 and 33, 331 are arranged outside the third side wall in a row parallel to the third side wall 123, and the input terminal and the output terminal in the same path are respectively located at the corresponding positions on both sides of the same row; The third side wall 123 is vertically connected between the first side wall 121 and the second side wall 122. According to the structure disclosed by the disclosure, crossed arrangement between copper parts (namely, the plurality of lead-out structures) is avoided, copper consumption (the plurality of lead-out structures is made of copper materials) can be reduced, the cost can be reduced, the copper parts (namely, the plurality of lead-out structures) can be formed simply, the assembly is easy, the spot-welding process is simplified, and the safe distance between high-voltage electricity can be ensured.

In the multi-phase electro-magnetic relay of the present disclosure, the movable-static contact matching structure is designed to include the first static contact piece, the first static contact, the first movable contact piece, the first movable contact, the second static contact piece, the second static contact, the second movable contact piece and the second movable contact, and the first static contact is fixed to one end of the first static contact piece and one end of the first movable contact piece, the first movable contact is fixed to the other end of the first movable contact piece, the second static contact is fixed to one end of the second static contact piece and one end of the second movable contact piece, the second movable contact is fixed to the other end of the second movable contact piece; The first static contact cooperates with the second movable contact, the second static contact cooperates with the first movable contact; The first static contact piece is used as the input terminal, the second static contact piece is used as the output terminal. According to the structure disclosed by the disclosure, the movable-static contact matching structure is designed as a parallel structure of double movable contact components, so that the copper consumption of the movable-static contact piece assembly inside the relay can be saved, and the cost can be further reduced.

In other embodiments, as shown in FIGS. 8, 9, 11 and 12, the multi-phase electromagnetic relay of the present disclosure does not include the base. In detail, the multi-phase electromagnetic relay includes a plurality of lead-out structures and a plurality of movable-static contact matching structures, each of the plurality of lead-out structure includes an input terminal and an output terminal, one movable-static contact matching structure is equipped between the input terminal and the output terminal in each of the plurality if the lead-out structures. Wherein all of the input terminals are disposed on one side of the movable-static contact matching structure, and all of the output terminal s are disposed on the other side of the movable-static contact matching structure. The plurality of the input terminals are arranged spaced from each other, without crossing, the plurality of the output terminals are arranged spaced from each other, without crossing, the plurality of the input terminals and the plurality of the output terminals s are arranged spaced from each other, without crossing. The plurality of the input terminals and the plurality of the output terminals are respectively provided with an external connection end, the plurality of the external connection end are arranged in a row, the external connection ends of the input terminals and the external connection ends of the output terminals in the same path (belong to one lead-out structure) are oppositely disposed on two sides of the movable-static contact matching structure.

Other structures of the multi-phase electromagnetic relay without the base are the same as those of the multi-phase electromagnetic relay with the base mentioned above, and will not be described here.

In addition, this disclosure also provides a connecting structure of electromagnetic relay for connecting lead-out piece and base.

A relay is an electronic control device that consists of a control system (also known as an input loop) and a controlled system (also known as an output loop). It is commonly used in automatic control circuits. Essentially, it acts as an automatic switch that employs a small current to control a larger current, enabling functions such as automatic adjustment, safety protection, and circuit conversion. The existing electromagnetic relay includes a base, a magnetic circuit part, a contact part, an armature assembly and a push card. The magnetic circuit part and the contact part are stalled on the base, the armature assembly cooperates with the magnetic circuit part, The magnetic circuit part can drive the armature assembly when it works; The push card is connected between the movable contact piece of the contact part and the armature assembly, and the armature assembly can drive the movable contact piece to swing when it moves, thus realizing the closure or separation of movable contact and static contact. The contact part of this electromagnetic relay usually includes a lead-out piece including a lead-out piece for movable contact piece and a lead-out piece for static contact piece. Wherein the lead-out pieces for static contact piece and static contact piece (i.e. components fixed with static contact) are integrated. In the existing electromagnetic relay, the connection structure between the lead-out piece and the base usually includes that first slots are arranged in the side wall of the base, and a second slot is arranged in the base. The middle section of the lead-out piece is inserted and fitted in the first slots of the base, the outer section of the lead-out piece extends out of the base for electrical connection with external components, and the inner section of the lead-out piece is located in the base. The end of the inner section of the lead-out piece is used to cooperate with the positioning of the second slot in the base. The existing connecting structure for the lead-out piece and the base usually adopts bevel edge positioning (that is, the end of the inner section of the lead-out piece is made into bevel edge), which is easy to come out during assembly, and the size of bevel is difficult to control and adjust.

Thus, this disclosure also provides a connecting structure of electromagnetic relay for connecting lead-out piece and base, through structural improvement, on the one hand, it can ensure the firmness of the lead-out piece assembly and make it not easy to come out; On the other hand, the positioning adjustment difficulty of the lead-out piece can be reduced.

The technical solutions adopted by the present disclosure are as follows: a connecting structure of electromagnetic relay for connecting lead-out piece and base includes a base and a lead-out piece; first slots on the side wall of the base, a second slot is defined inside the base; The middle sections of the lead-out pieces are inserted into the first slots of the base, the outer section of the lead-out piece extends out of the base for electrical connection with external components, and the inner section of the lead-out piece is located in the base; The end of the inner section of the lead-out piece is provided with a Z-shaped piece, and the Z-shaped piece is inserted and fitted in the second slot of the base, so as to adjust the positioning position of the lead-out piece in the base by using the drop between two straight side sections of the Z-shaped piece.

According to an embodiment of present disclosure, the thickness of the Z-shaped piece is smaller than that of the body of the lead-out piece.

According to an embodiment of present disclosure, includes a first straight segment integrally connected to the body of the lead-out piece, a second straight segment with a free end and a bevel segment integrally connected between the first straight segment and the second straight segment. There is interference fit between the second straight segment and the second slot of the base.

According to an embodiment of present disclosure, the second straight segment of the Z-shaped piece deviates from the range of the body thickness of the lead-out piece in the direction of the body thickness of the lead-out piece.

According to an embodiment of present disclosure, among the walls of the second slot of the base, in one of the walls facing the outer side of the second straight segment of the Z-shaped piece, a first bump is protruded to the outer side of the second straight segment of the Z-shaped piece, With the cooperation of the first bump and the second straight segment of the Z-shaped piece, the positioning of the lead-out piece in the base can be realized.

According to an embodiment of present disclosure, among the walls of the second slot of the base, in another wall facing the inner side of the second straight segment of the Z-shaped piece, a second bump is also protruded to the inner side of the second straight segment of the Z-shaped piece, In order to realize the interference fit between the lead-out piece and the base by using the cooperation between the second bump and the second straight segment of the Z-shaped piece.

According to an embodiment of present disclosure, the area of the first bump abutting on the outer side of the second straight segment of the Z-shaped piece is larger than that of the second bump abutting on the inner side of the second straight segment of the Z-shaped piece.

According to an embodiment of present disclosure, the lead-out piece is a static contact piece, and the end of the inner section of the lead-out piece is fixedly connected with a static contact.

According to an embodiment of present disclosure, The end of the inner section of the lead-out piece is also connected with one end of the movable contact piece, and the other end of the movable contact piece is fixed with a movable contact; Two lead-out pieces and the movable contact piece connected by two lead-out pieces respectively form a set of the movable-static contact matching structure. The static contact connected by one of the lead-out pieces cooperates with the movable contact on the movable contact piece connected by another one of the lead-out pieces, The static contact connected by the other lead-out piece cooperates with the movable contact on the movable contact piece connected by the lead-out piece; The first slots are respectively disposed in two opposite side walls of the base, so as to be cooperated with the middle section of the two lead-out piece.

According to an embodiment of present disclosure, there are many sets of the movable-static contact matching structure. The side wall of the base is sequentially provided with a plurality of the first slots, and the plurality of second slots are correspondingly provided in the base. The middle segments of two lead-out pieces of the movable-static contact matching structure are respectively cooperated in the first slot of the base.

Compared with the prior art, the connecting structure of electromagnetic relay for connecting lead-out piece and base of the present disclosure have the following beneficial effects:

In this disclosure, the end of the inner section of the lead-out piece is provided with the Z-shaped piece, and the z-shaped piece at the end of the inner section of the lead-out piece is inserted and fitted in the second slot of the base. According to the structure disclosed by the disclosure, the positioning position of the lead-out piece in the base can be adjusted by using the drop between the two straight side sections of the Z-shaped piece. On the one hand, the disclosure can ensure the firmness of the assembly of the lead-out piece, so that it is not easy to come out; On the other hand, it can better reduce the difficulty of positioning adjustment of the lead-out piece.

The present disclosure will be described in detail with reference to FIGS. 14 to 22 and examples. However, the connecting structure of electromagnetic relay for connecting lead-out piece and base disclosed in this disclosure are not limited to the embodiments.

Referring to FIGS. 13 to 21, the connecting structure of electromagnetic relay for connecting lead-out piece and base of present disclosure includes a base 1 and a lead-out piece 2; The side wall 12 of the base 1 is provided with first slots 120, and second slots 130 are provided in the base 1; The middle sections of the lead-out pieces 2 are inserted into the first slots 120 of the base 1, the outer sections 210 of the lead-out pieces 2 extend out of the base 1 for electrical connection with external components, and the inner sections 220 of the lead-out pieces 2 are located in the base 1; The end of the inner sections 220 of the lead-out pieces 2 are respectively provided with a Z-shaped piece 3, and the Z-shaped pieces 3 at the end of the inner sections of the lead-out pieces 2 are inserted into the second slots 130 of the base 1. To adjust the positioning position of the lead-out pieces 2 in the base 1 by using the drop between the two straight side segments of the Z-shaped piece 3.

Figure 13:
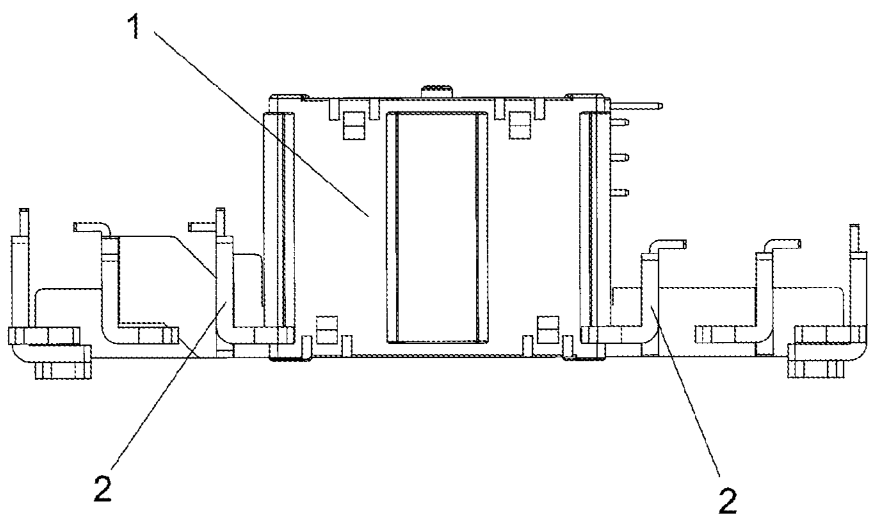
FIG. 13 is a structural schematic diagram of another embodiment of an electromagnetic relay using the present disclosure, in which the connection structure of a lead-out piece and the base is shown.
Figure 14:
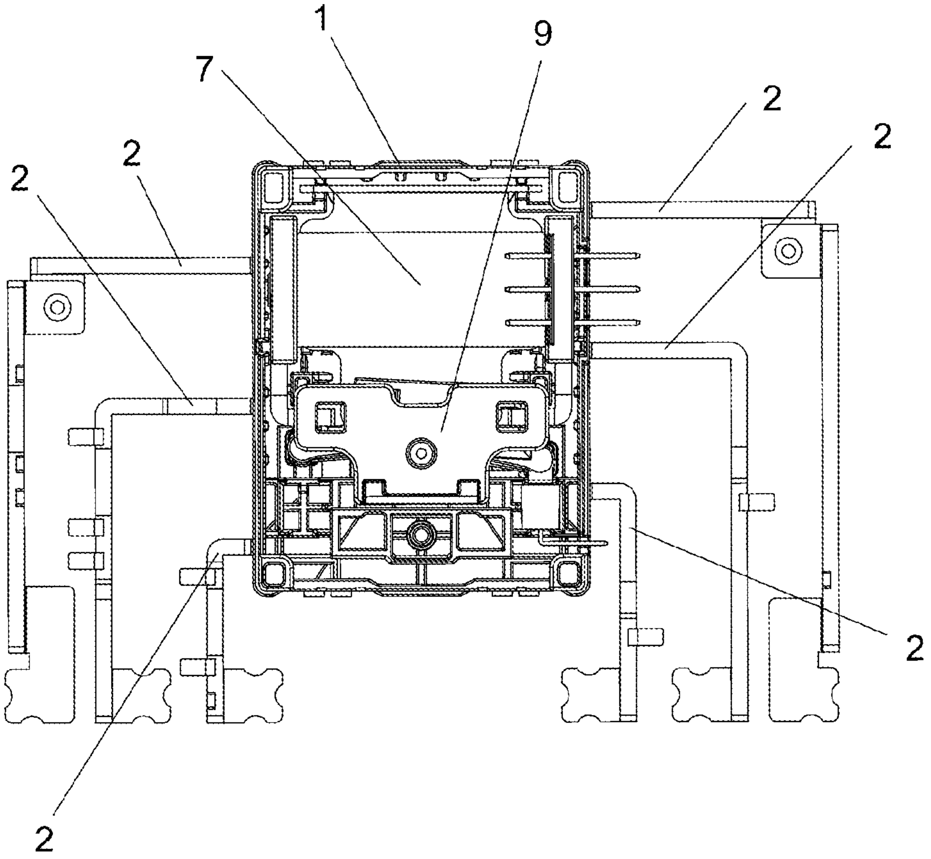
FIG. 14 is a top view of FIG. 13.
Figure 15:
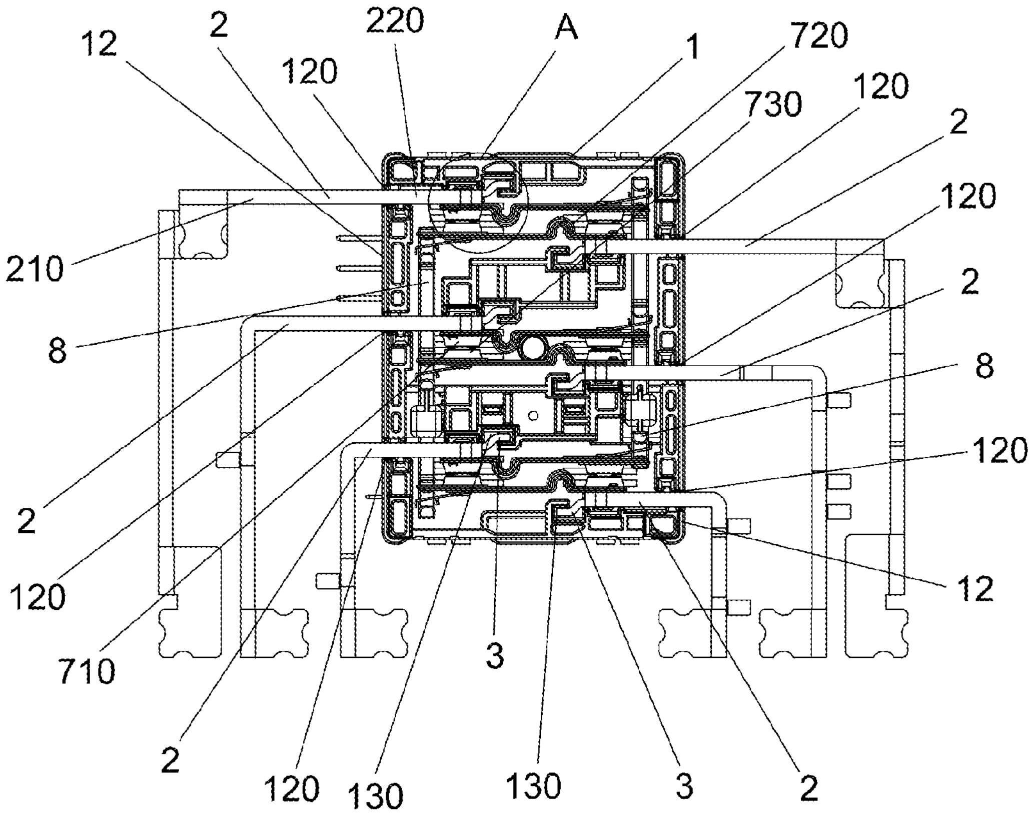
FIG. 15 is a bottom view of FIG. 14.

As shown in FIG. 13 to FIG. 15, in this embodiment, the electromagnetic relay using the connecting structure includes a magnetic circuit part 7, an armature assembly 9 and a push card 8, and the base 1 has a two-layer structure. The magnetic circuit part 7 and the armature assembly 9 are installed on one layer, and the push card 8 and the contact part containing the lead-out piece 2 are installed on the other layer. The push arm of the armature assembly 9 extends from one layer of the base 1 to another layer of the base 1, and cooperates with the movable contact piece of the contact part.

Figure 16:
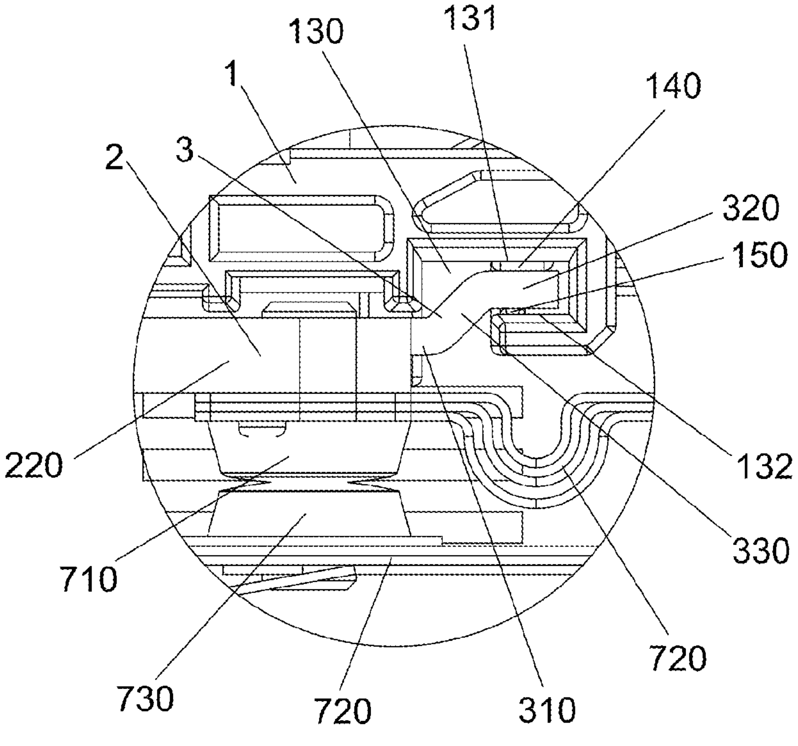
FIG. 16 is an enlarged schematic view of part A in FIG. 15.

As shown in FIG. 16, in this embodiment, the thickness of the Z-shaped piece 3 is smaller than that of the body of the lead-out piece 2.

In this embodiment, The Z-shaped piece 3 includes a first straight segment 310 integrally connected to the body of the lead-out piece 2, A second straight segment 320 with a free end and a bevel segment 330 integrally connected between the first straight segment and the second straight segment; There is an interference fit between the second straight segment 320 and the second slot 130 of the base 1.

In this embodiment, the second straight segment 320 of the Z-shaped piece 3 is out of the range of the thickness of the body of the lead-out piece 2.

In this embodiment, among the walls of the second slot 130 of the base 1, in one of the walls 131 facing the outer side of the second straight segment 320 of the Z-shaped piece 3, a first bump 140 is also protruded to the outer side of the second straight segment 320 of the Z-shaped piece 3.

With the cooperation of the first bump 140 and the second straight segment 320 of the Z-shaped piece 3, the positioning of the lead-out piece 2 in the base 1 can be realized.

In the embodiment, among the walls of the second slot 130 of the base 1, in another wall 132 facing the inner side of the second straight segment 320 of the Z-shaped piece 3, a second bump 150 is also protruded to the inner side of the second straight segment 320 of the Z-shaped piece 3. With the cooperation of the second bump 150 and the second straight segment 320 of the Z-shaped piece 3, the interference fit between the lead-out piece 2 and the base 1 is realized.

In this embodiment, the area of the first bump 140 abutting on the outer side of the second straight segment 320 of the Z-shaped piece 3 is larger than the area of the second bump 150 abutting on the inner side of the second straight segment 320 of the Z-shaped piece 3.

In this embodiment, the lead-out piece 2 is a static contact piece, and the end of the inner section of the lead-out piece 2 is fixed with a static contact 710.

Figure 17:
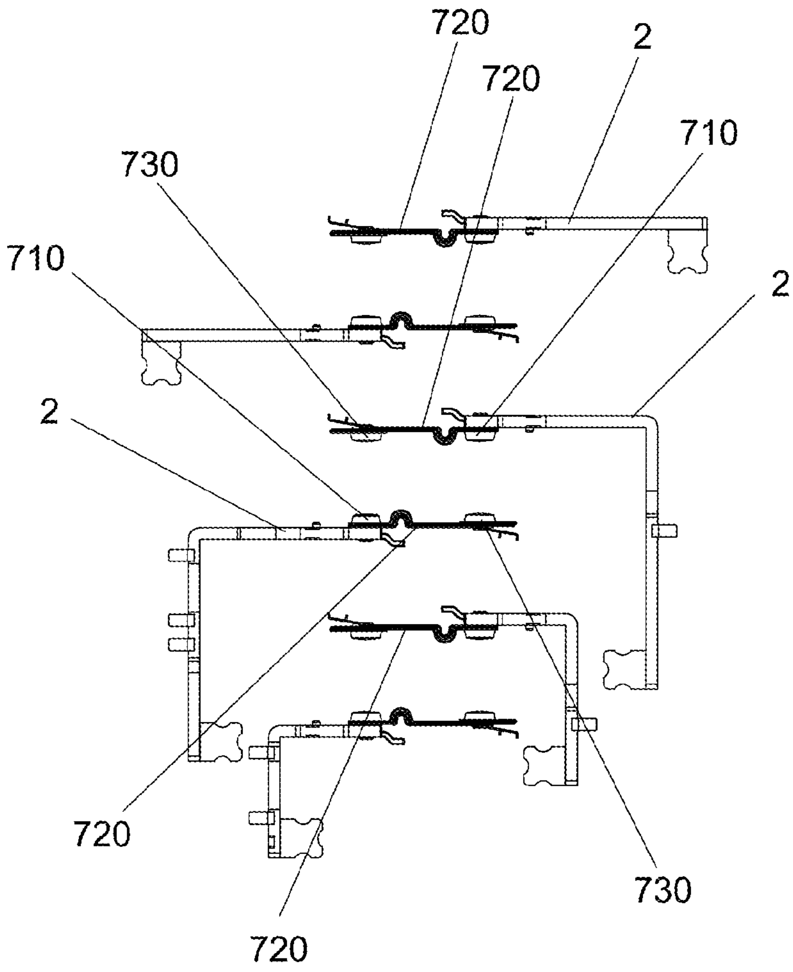
FIG. 17 is a schematic diagram showing the distribution of three groups of the movable-static contact matching structures in the electromagnetic relay shown in FIG. 13.
Figure 18:
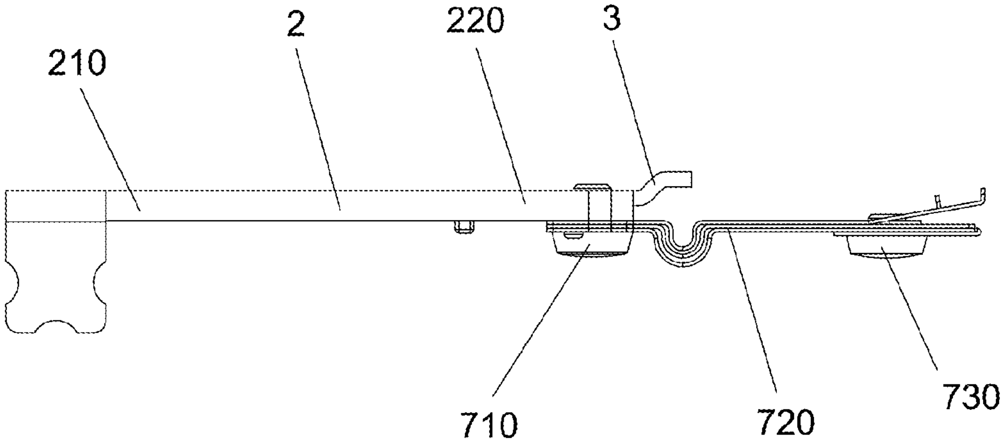
FIG. 18 is a schematic diagram of the lead-out piece in the electromagnetic relay shown in FIG. 13 cooperating with the movable contact piece.
Figure 19:
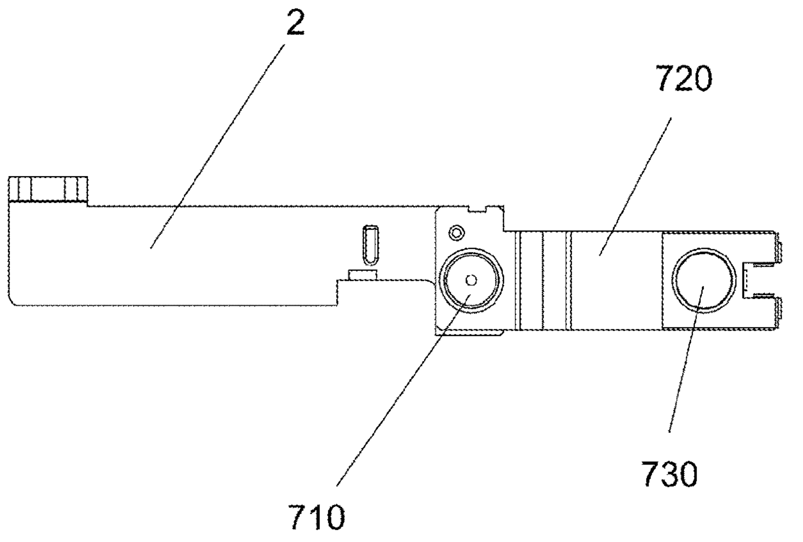
FIG. 19 is a bottom view of FIG. 18.
Figure 20:
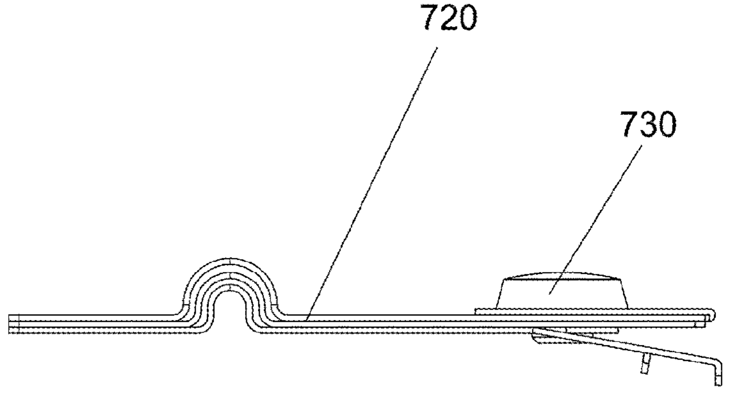
FIG. 20 is a schematic structural diagram of the movable contact piece in the electromagnetic relay shown in FIG. 13.
Figure 21:
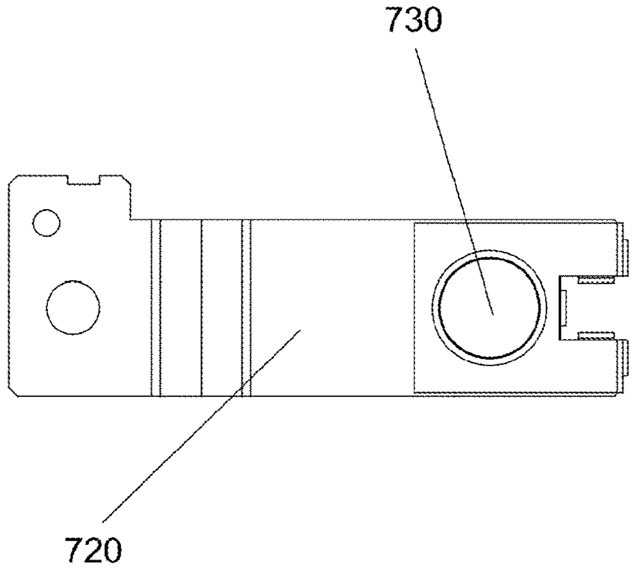
FIG. 21 is a top view of FIG. 20.
Figure 22:
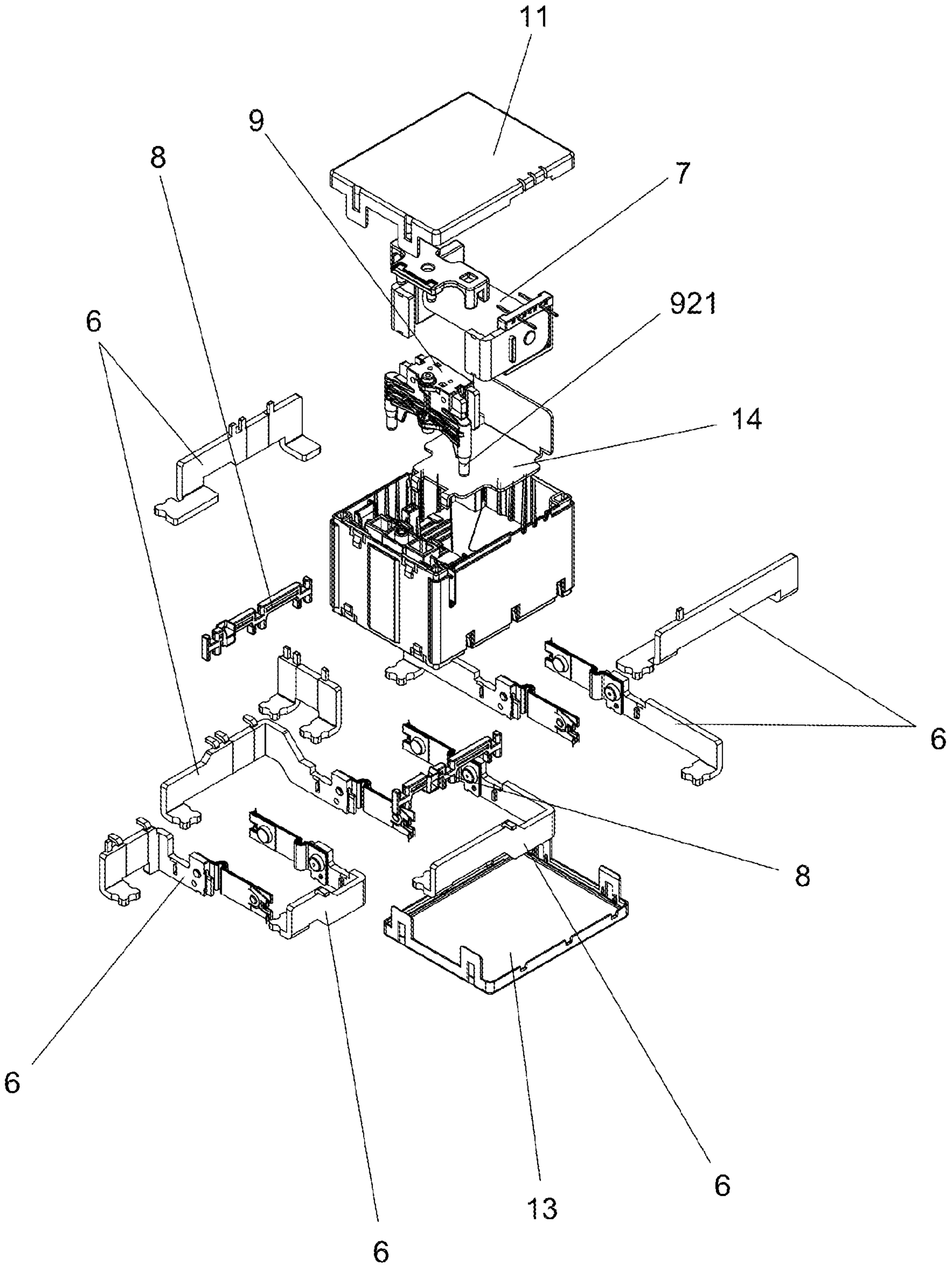
FIG. 22 is a perspective exploded view of an embodiment of the electromagnetic relay with the push card of the present disclosure.
Figure 23:
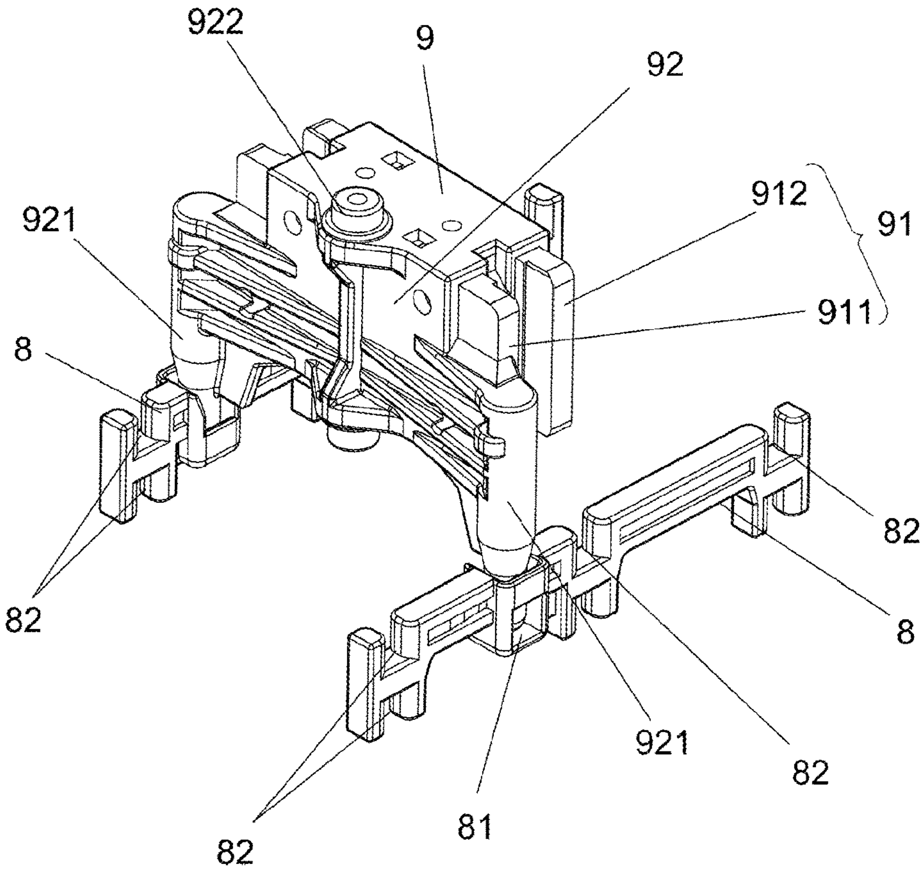
FIG. 23 is a three-dimensional exploded view of the cooperation between the armature assembly and the push card in the embodiment shown in FIG. 22.
Figure 24:
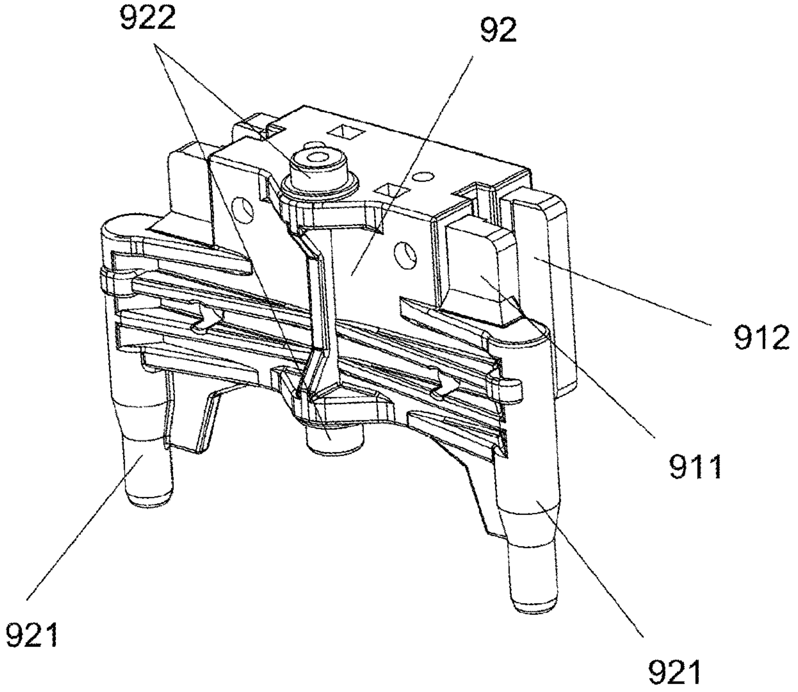
FIG. 24 is a schematic view of the three-dimensional structure of the armature assembly in the embodiment shown in FIG. 22.
Figure 25:
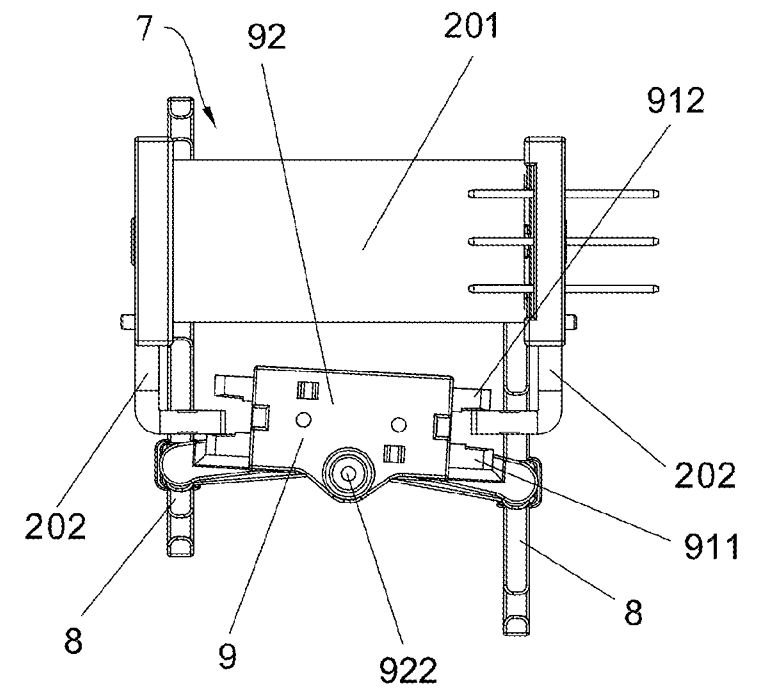
FIG. 25 is a schematic diagram of the cooperation among the armature assembly, the push card and the magnetic circuit part in the embodiment shown in FIG. 22.
Figure 26:
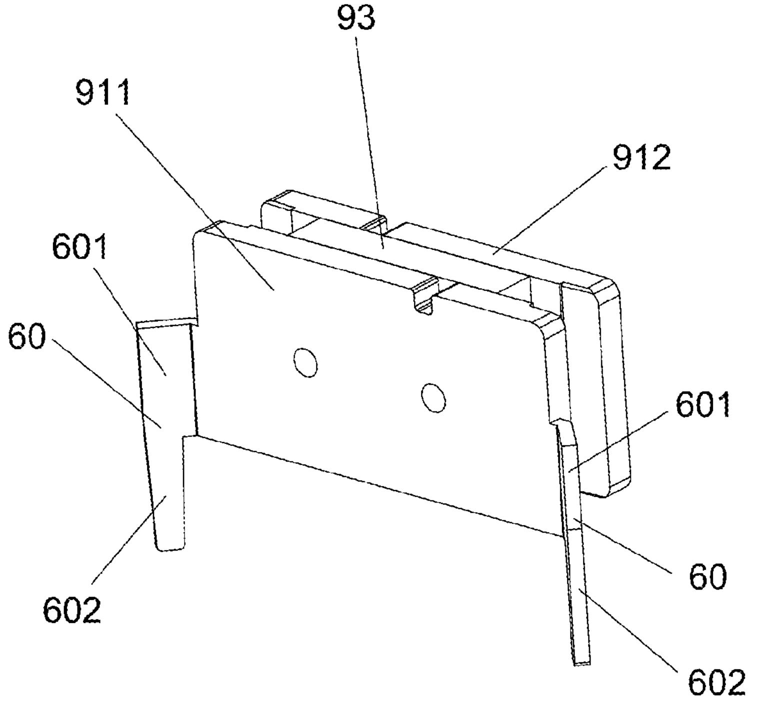
FIG. 26 is a schematic view of the three-dimensional structure of the armature and magnetic steel in the armature assembly in the embodiment shown in FIG. 22.
Figure 27:
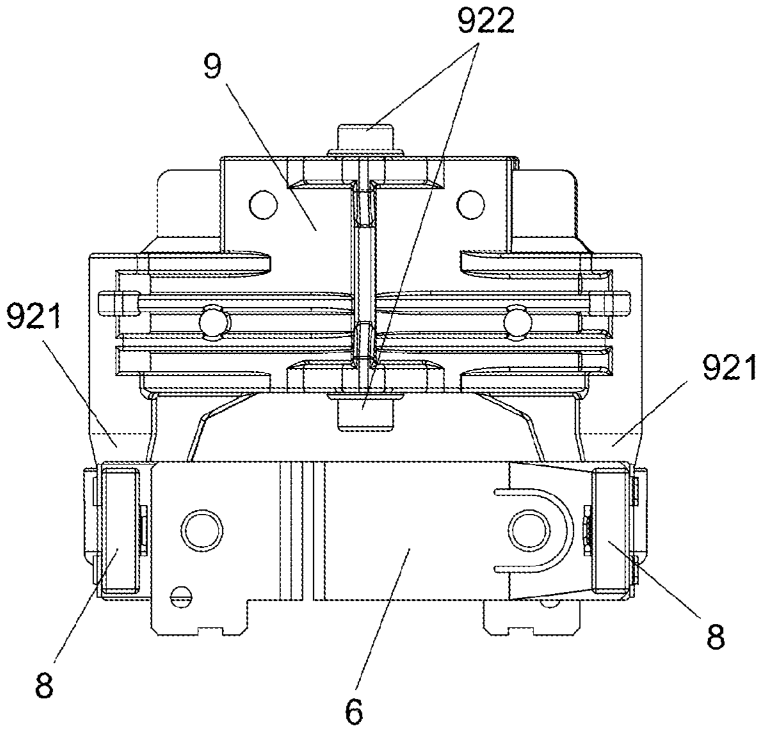
FIG. 27 is a schematic structural diagram of the cooperation among the armature assembly, the push card and the contact part in the embodiment shown in FIG. 22.
Figure 28:
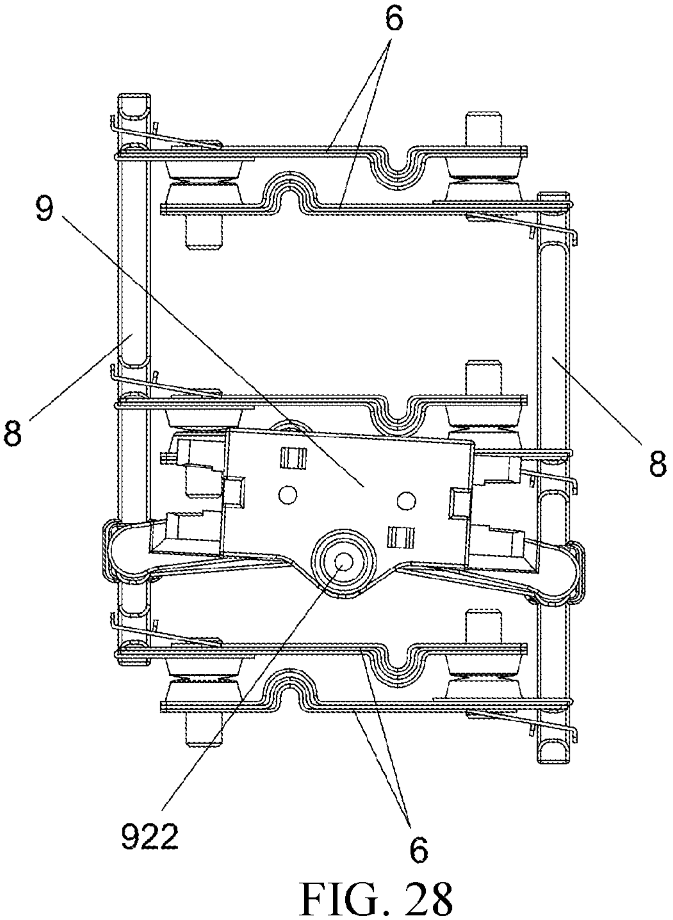
FIG. 28 is a top view of FIG. 27.
Figure 29:
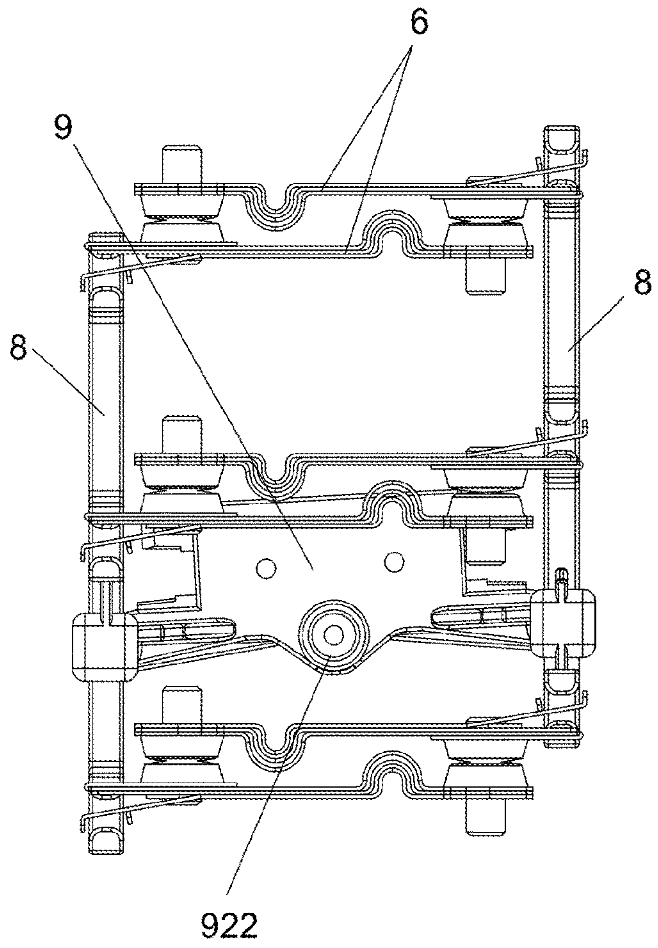
FIG. 29 is a bottom view of FIG. 27.
Figure 30:
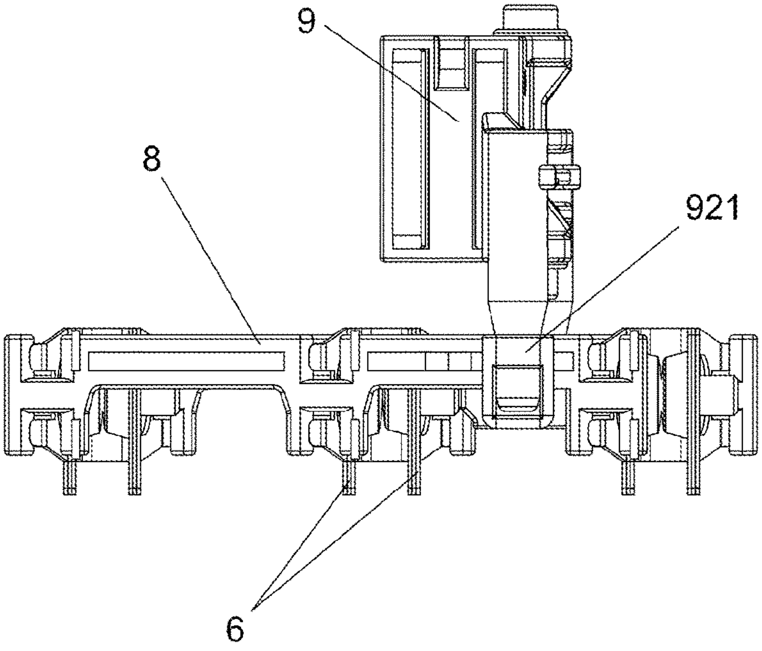
FIG. 30 is a side view of FIG. 27.
Figure 31:
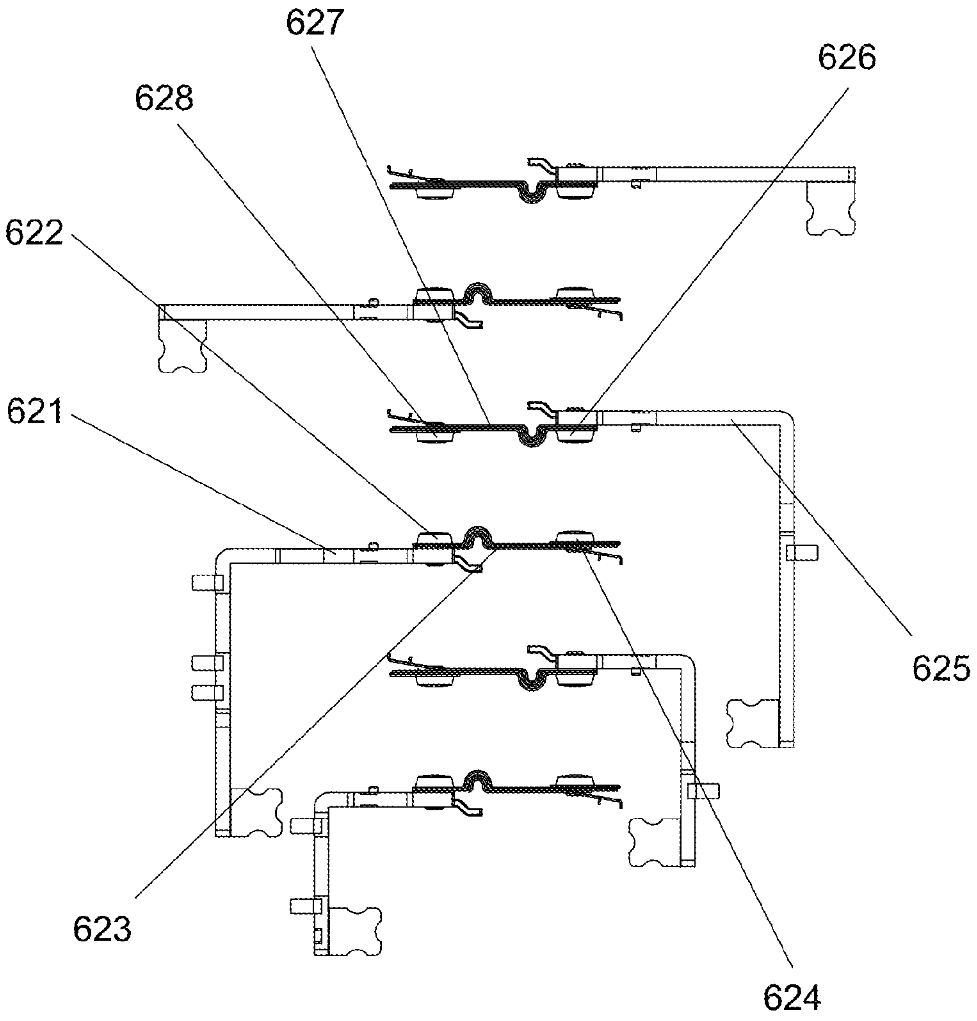
FIG. 31 is a schematic diagram of a contact part in an embodiment of the present disclosure.

As shown in FIG. 17, in this embodiment, the contact part adopts a parallel structure of double movable contact piece components. The end of the inner section 220 of the lead-out piece 2 is connected with one end of a movable contact piece 720 (that is, the end of the inner section 220 of the lead-out piece 2 and one end of the movable contact piece 720 are fixed together by a static contact 710), and the other end of the movable contact piece 720 is fixed with a movable contact 730; Two lead-out pieces 2 and the movable contact pieces 720 respectively connected by two lead-out pieces 2 constitutes a set of movable-static contact matching structure, The static contact 710 connected with one of the lead-out pieces 2 is cooperated with the movable contact 730 on the movable contact piece 72 connected with the other lead-out pieces 2. The static contact 710 connected to the other lead-out piece 2 is cooperated with the movable contact 730 on the movable contact piece 720 connected to the lead-out piece 2. The first slots 120 are respectively arranged in the two opposite side walls 12 of the base 1, so as to be respectively cooperated with the middle section of the two lead-out pieces 2.

As shown in FIGS. 13-15 and 17, in this embodiment, the electromagnetic relay is a three-phase magnetic latching relay, and there are three sets of the movable-static contact matching structure, and three of the first slots 120 are sequentially arranged in two opposite side walls of the base 1, and six second slots are correspondingly arranged in the base; The middle segments of two lead-out pieces 2 of three sets of movable-static contact matching structure are respectively cooperated in the first slots 120 of two opposite side walls 12 of the base.

In the connecting structure of electromagnetic relay for connecting lead-out piece and base of present disclosure, the Z-shaped piece 3 is arranged at the end of the inner section 220 of the lead-out piece 2, and the Z-shaped piece 3 at the end of the inner section of the lead-out piece 2 is inserted into the second slot 130 of the base 1. With this structure disclosed in this disclosure, the positioning position of the lead-out piece 2 in the base 1 can be adjusted by using the drop between the two straight side sections of the Z-shaped piece 3. On the one hand, this disclosure can ensure the firmness of the assembly of the lead-out piece 2, so that it is not easy to come out; On the other hand, it can better reduce the difficulty of positioning adjustment of the lead-out piece 2.

In addition, the disclosure also provides an electromagnetic relay having a push card.

A relay is an electronic control device that consists of a control system (also known as an input loop) and a controlled system (also known as an output loop). It is commonly used in automatic control circuits. Essentially, it acts as an automatic switch that employs a small current to control a larger current, enabling functions such as automatic adjustment, safety protection, and circuit conversion. The armature is an important part of the electromagnetic relay. Through the cooperation between the armature and the magnetic circuit part of the electromagnetic relay, the movable contact piece of the contact part of the electromagnetic relay can be driven to move, and movable contact and static contact can be closed or separated. In the existing electromagnetic relay, plastic and armature are injected together to form the armature assembly, and a push arm is formed by plastic injection, and the push arm of the armature assembly drives the push card to move back and forth. Then through the cooperation of the push card and the movable contact piece of the contact part, the movable contact piece is driven to move, and the closure or separation of the movable contact and static contact is realized. This kind of electromagnetic relay with push card, the plastic push arm of the armament assembly will be subjected to the reaction force transmitted by the movable contact piece through the push card. Especially in the case of multiple sets of movable contact pieces, the plastic push arm of the armature assembly will be subjected to greater reaction force, while the push arm made of pure plastic will be easily deformed when heated and absorbed by water in high temperature and high humidity environment, which will lead to the unstable attraction state of products and affect the normal use of electromagnetic relays.

The purpose of the present disclosure is to overcome the shortcomings of the prior art and provide an electromagnetic relay having a push card. Through structural improvement, the push-pull strength of the plastic push arm of the armament assembly can be increased, When it is applied to multiple sets of movable contact pieces, it can adapt to the greater reaction force transmitted by the movable contact pieces through the push card, and it is not easy to deform when heated and absorbed in high temperature and high humidity environment, thus ensuring the stability of the product's attraction state.

The technical solution adopted by this disclosure to solve its technical problems is as follows: an electromagnetic relay having push card the electromagnetic includes a base, a magnetic circuit part, a armature assembly, a push card and a contact part; The magnetic circuit part, the armature assembly and contact part are installed in the preset position of the base, and the magnetic circuit part and the armature assembly can be cooperated correspondingly; The push card fits between the armature assembly and contact part; The armature assembly includes an armature and a plastic member covering a part of the armature. The plastic member is provided with a plastic push arm extending toward the push card. The push card is provided with a first clip slot, the plastic push arm of the armature assembly is cooperated in the first clip slot of the push card; The armature is provided with a metal insert integrally extending to the plastic push arm, and the plastic push arm completely covers the metal insert, so that the push-pull strength of the plastic push arm of the armature assembly is increased by using the metal insert, and the problem that the plastic push arm is easily deformed when heated and absorbed by water in a high-temperature and high-humidity environment is solved.

According to an embodiment of present disclosure, the base is divided into an upper layer and a lower layer. The magnetic circuit part and the armature assembly are stalled on the upper layer of the base; the contact part is stalled on the lower layer of the base. The push card cooperates with the contact part on the lower layer of the base; The plastic push arm with the metal insert of the armature assembly extends from the upper layer of the base to the lower layer of the base and cooperates with the push card.

According to an embodiment of present disclosure, there are two armatures in the armature assembly. The armature assembly further includes a permanent magnet sandwiched between two armatures. The plastic member covers the middle part of two armatures and the permanent magnet; The metal insert is arranged at the end edge of the length of one of the two armatures.

According to an embodiment of present disclosure, The metal insert is bent at an angle relative to the body surface of one of the armatures, and the metal insert is biased outward relative to one of the armatures; and the thickness of the metal insert is smaller than that of the body of one armature.

According to an embodiment of present disclosure, the metal insert includes a first part which is located within the width range of the body of one armature and a second part which is located outside the width range of the body of one armature and continues to extend outward from the first part.

According to an embodiment of present disclosure, the plastic member is provided with a rotating shaft which can be assembled in the base; The rotating shaft deviates from the center line of the component consisting of two armatures and the permanent magnet.

According to an embodiment of present disclosure, There are two push cards, and the plastic member is provided with two plastic push arms for corresponding adaptation with two push cards, wherein both ends of the length of one armature are respectively provided with the metal insert, and two plastic push arms respectively cover the metal insert at both ends of the length of one armature.

According to an embodiment of present disclosure, the axes of two plastic push arms and the rotating shaft are in the same plane.

According to an embodiment of present disclosure, Two push cards are respectively provided with a plurality of second clip slots for matching with the contact part, the plurality of the second clip slots are distributed along the length direction of the push card, and the first clip slot are arranged between a pair of adjacent second clip slots.

According to an embodiment of present disclosure, the contact part includes a plurality of movable-static contact matching structures; each of the plurality sets of the movable-static contact matching structures includes a first static contact piece, a first static contact, a first movable contact piece, a first movable contact, a second static contact piece, a second static contact, a second movable contact piece and a second movable contact. The first static contact is fixed to one end of the first static contact piece and one end of the first movable contact piece, the first movable contact is fixed to the other end of the first movable contact piece, the second static contact is fixed to one end of the second static contact piece and one end of the second movable contact piece, the second movable contact is fixed to the other end of the second movable contact piece; The first static contact cooperates with the second movable contact, the second static contact cooperates with the first movable contact; The corresponding second clip slots in two push cards are matched with the other end of the first movable contact piece and the other end of the second movable contact piece respectively.

Compared with the prior art, the electromagnetic relay having a push card has the following beneficial effects:

In this disclosure, the metal insert extending integrally to the plastic push arm is arranged in the armature, and the plastic push arm completely covers the metal insert. According to the structure disclosed by the invention, the metal insert can be used to increase the push-pull strength of the plastic push arm of the armament assembly, and the defect that the pure plastic swing arm in the prior art is easy to deform when heated and absorbs water in a high-temperature and high-humidity environment, so that the product attraction state is unstable, thereby improving the deformation. The disclosure can also solve the problems of unstable deformation size of the pure iron swing arm during heat treatment and large dispersion difference between different lots of iron strip material thickness. For example, when the size is to be adjusted, the adjustment may be implemented by adjusting the injection mold, without adjusting iron parts, which is more conducive to size control.

In this disclosure, the base is divided into upper and lower layers, and the plastic push arm with the metal insert of the armature assembly is extended from the upper layer of the base to the lower layer of the base to cooperate with the push card. The armature assembly adopts an eccentric double swing arm structure, and the plastic push arm extends downward, so that the swing arm and the movable contact piece are in the same layer. With the structure disclosed in the present disclosure, the armature assembly can synchronously push the two push cards, and make the push-pull contact point and the moving direction on the same straight line.

In this disclosure, the contact part is designed as multiple sets of movable-static contact matching structures, and each set of the movable-static contact matching structure adopts double movable contact components in parallel. According to the structure disclosed in the present disclosure, the metal insert can be used to increase the strength of the plastic push arm of the armature assembly, so as to bear the reaction force transmitted by multiple sets movable contact pieces through the push card, and ensure the stability of the product's attraction state.

The present disclosure will be further described in detail with reference to FIGS. 22 to 31 and examples. However, the disclosed electromagnetic relay having a push card is not limited to the embodiments.

Referring to FIGS. 22 to 31, the electromagnetic relay having push card the electromagnetic of the present disclosure includes a base 1, a magnetic circuit part 7, an armature assembly 9, a push card 8 and a contact part 6; The magnetic circuit part 7, the armature assembly 9 and contact part 6 are installed in the preset position of the base 1 respectively, and the magnetic circuit part 7 and the military assembly 9 can be cooperated correspondingly; The push card 8 fits between the armature assembly 9 and the contact part 6. The armature assembly 9 includes an armature 91 and a plastic member 92 covering a part of the armature. The plastic member 92 is provided with a plastic push arm 921 extending toward the push card. The push card 8 is provided with a first clip slot 81, the plastic push arm 921 of the armature assembly 9 is cooperated in the first clip slot 81 of the push card 8; The armature 91 is provided with a metal insert 60 integrally extending to the plastic push arm 921, and the plastic push arm 921 completely covers the metal insert 60, so that the push-pull strength of the plastic push arm 921 of the armature assembly 9 is increased by using the metal insert 60, and the problem that the plastic push arm 921 is easily deformed when heated and absorbed by water in a high-temperature and high-humidity environment is solved.

In this embodiment, the base 1 is divided into an upper layer and a lower layer. The base 1 includes an upper housing 11, a Side wall 12 in a circle, a lower housing 13 and a partition 14. The upper housing 11 and the lower housing 13 are respectively fixed at the upper and lower ends of the side wall 12, and the partition 14 is installed in the side wall 12. The upper housing 11, the side wall 12 and the partition 14 enclose the upper layer of the base 1, and the lower housing 13, the side wall 12 and the partition 14 enclose the lower layer of the base 1. The magnetic circuit part 7 and the armature assembly 9 are assembled on the upper layer of the base 1; The contact part 6 is assembled on the lower layer of the base 1, and the push card 8 is cooperated with the contact part 6 on the lower layer of the base 1; The plastic push arm 921 with metal inserts of the armature assembly 9 extends from the upper layer of the base to the lower layer of the base and cooperates with the push card 8.

In this embodiment, the armature 91 of the armature assembly 9 includes an armature 911 and an armature 912. The armature assembly 9 further includes a permanent magnet 93 sandwiched between two armatures 911 and 912. The plastic member 92 is wrapped around the middle part of two armatures 911 and 912 and the permanent magnet 93, so that the armature assembly 9 has an T-shaped structure; The metal inserts 60 are provided at the end edge of the length of one of the two armatures 911, 912.

In this embodiment, the metal insert 60 is bent at an angle with respect to the body surface of one of the armatures 911, and the metal insert 60 is biased outward with respect to the armature 911; And the thickness of the metal insert 60 is smaller than that of the body of one of the armatures 911.

In this embodiment, each of the metal insert 60 includes a first portion 601 located in one of the width ranges of the body of one armature 911 and a second portion 603 extending outward from the first portion 601 beyond the width range of the body of the armature 911.

In this embodiment, the plastic member 92 is provided with a rotating shaft 922 that can be assembled in the base, which enables the armature assembly 9 to swing around the rotating shaft 922 and the plastic push arm 921 to swing. The magnetic circuit part 7 includes A coil 201 and yokes 202, one ends of two yokes 202 of the magnetic circuit part 7 respectively extend into the openings on both sides of the I-shaped structure of the armature assembly 9. The rotating shaft 922 is offset from the center line of the component consisting of two armatures 911 and 912 and a permanent magnet 93.

In this embodiment, there are two push cards 8, the plastic member 92 is provided with two plastic push arms 921 for corresponding adaptation with the two push cards 8, and both ends of the length of one armature 911 are respectively provided with the metal insert 60. The plastic push arms 921 respectively cover the metal insert 60 at both ends of the length of one armature 911.

In this embodiment, the axes of two plastic push arm 921*s* and the rotating shaft 922 are in the same plane.

In this embodiment, two push cards 8 are respectively provided with three second clip slots 82 for matching with the contact parts 6, and the three second clip slots 82 are distributed along the length direction of the push card 8, and the first clip slot 81 are arranged between a pair of adjacent second clip slots 82.

In this embodiment, the contact part 6 includes three sets of the movable-static contact matching structures; each of the three sets of movable-static contact matching structures includes a first static contact piece 621, a first static contact 622, a first movable contact piece 623, a first movable contact 624, a second static contact piece 625, a second static contact 626, a second movable contact piece 627 and a second movable contact 628; The first static contact 622 is fixed to one end of the first static contact piece 621 and one end of the first movable contact piece 623, the first movable contact 624 is fixed to the other end of the first movable contact piece 623, the second static contact 626 is fixed to one end of the second static contact piece 625 and one end of the second movable contact piece 627, the second movable contact 628 is fixed to the other end of the second movable contact piece 627; The first static contact 622 is cooperated with the second movable contact 628, the second static contact 626 is cooperated with the first movable contact 624; The corresponding second clip slots 82 in two push cards 8 are respectively matched with the other end of the first movable contact piece 621 and the other end of the second movable contact piece 625.

In the electromagnetic relay having push card the electromagnetic of the present disclosure, the armature 911 is also provided with the metal insert 60 extending integrally to the plastic push arm 921, and the plastic push arm 921 completely covers the metal insert 60. According to the structure disclosed in the present disclosure, the metal insert 60 can be used to increase the push-pull strength of the plastic push arm 921 of the armature assembly 9, which can solve the defect that the pure plastic swing arm in the prior art is easy to deform when heated and absorbs water in a high-temperature and high-humidity environment, thereby improving the deformation. The invention can also solve the problems of unstable deformation size of the pure iron swing arm during heat treatment and large dispersion difference between different batches of iron strip material thickness. For example, when the size is to be adjusted, the adjustment may be implemented by adjusting the injection mold, without adjusting any iron parts, which is more conducive to size control.

In the electromagnetic relay having push card the electromagnetic of the present disclosure, the base 1 is divided into upper and lower layers, and the plastic push arm 921 with the metal insert of the armature assembly 9 is extended from the upper layer of the base 1 to the lower layer of the base 1 to cooperate with the push card 8. The armature assembly 9 adopts an eccentric double swing arm structure, and the plastic push arm extends downwards, so that the swing arm and the movable contact piece are in the same layer. With the structure disclosed in this disclosure, the armature assembly 9 can synchronously push two push card 8 to move, and make the push-pull contact point and the moving direction on the same straight line.

In the electromagnetic relay having push card the electromagnetic of the present disclosure, the contact part 6 is designed as three sets of the movable-static contact matching structure; And each set of the movable-static contact matching structure adopts double movable contact piece components in parallel. With this structure disclosed in the present disclosure, the metal insert 60 can be used to increase the strength of the plastic push arm 921 of the armature assembly 9, to bear the reaction force transmitted by three sets of movable contact pieces through the push cards 8, and to ensure the stability of the product's attraction state.

The above is only the preferred embodiment of this disclosure, but not intended to limit this disclosure in any form. Although the present disclosure has been disclosed above with preferred embodiments, it is not intended to limit this disclosure. Any killed person in the art could make possible changes and modifications to the technical solution of this disclosure by using the technical contents disclosed above, or equivalent embodiments. Therefore, any simple modifications and equivalent changes made to the above embodiments according to the technical solution of this disclosure, which does not depart from the contents of the technical solution of this disclosure, should fall within the protection scope of the present disclosure.

What is claimed is:

1. A multi-phase electromagnetic relay, comprising:

a plurality of lead-out structures, each of the plurality of lead-out structures comprising an input terminal and an output terminal, and a plurality of movable-static contact matching structures, respectively provided between the input terminal and the output terminal of each of the plurality of lead-out structures, wherein all the plurality of input terminals are arranged on one side of the movable-static contact matching structures, and all the plurality of output terminals are arranged on another side of the movable-static contact matching structures, wherein:

the plurality of input terminals are spaced from each other, and are not crossing, the plurality of output terminals are spaced from each other, and are not crossing, the plurality of input terminals and the plurality of output terminals are spaced from each other, and are not crossing, external connection ends of the plurality of input terminals and the plurality of output terminals both extend in a same direction, both the external connection end of the input terminal and the external connection end of the output terminal of each of the plurality of lead-out structures are oppositely disposed on two sides of a movable-static contact matching structure of the plurality of movable-static contact matching structures, and an external connection end of a neutral input terminal and an external connection end of a neutral output terminal are provided between the external connection ends of the plurality of input terminals and the external connection ends of the plurality of output terminals.

2. The multi-phase electromagnetic relay according to claim 1, wherein the external connection ends of the plurality of input terminals and the external connection ends of the plurality of output terminals are arranged in a row.

3. The multi-phase electromagnetic relay according to claim 2, further comprising a base, wherein:

the input terminal and the output terminal are respectively led out from two opposite sides of the base, and the external connection end is located outside the base.

4. The multi-phase electromagnetic relay according to claim 1, wherein:

the plurality of input terminals and the plurality of output terminals are oppositely disposed, and the plurality of input terminals and the plurality of output terminals respectively comprise an L-shaped body comprising a first portion and a second portion, wherein one end of the second portion constitutes the external connection end.

5. The multi-phase electromagnetic relay according to claim 4, wherein the body is of a sheet structure.

6. The multi-phase electromagnetic relay according to claim 4, wherein the first portion and the second portion are integrated.

7. The multi-phase electromagnetic relay according to claim 4, wherein the first portion and the second portion are two independent parts, and fixed together by welding.

8. The multi-phase electromagnetic relay according to claim 4, wherein the second portion of the input terminal comprises a splitter sheet for collecting current signals.

9. The multi-phase electromagnetic relay according to claim 1, wherein:

the external connection end of the neutral input terminal and the external connection end of the neutral output terminal are connected by an electrical connecting piece.

10. The multi-phase electromagnetic relay according to claim 9, wherein the external connection ends of the plurality of input terminals, the external connection ends of the plurality of output terminals, the external connection end of the neutral input terminal, and the external connection end of the neutral output terminal are arranged in a row.

11. The multi-phase electromagnetic relay according to claim 9, further comprising a plurality of external connectors, wherein the plurality of external connectors are respectively disposed on the external connection ends of the plurality of input terminals and the external connection ends of the plurality of output terminals.

12. The multi-phase electromagnetic relay according to claim 11, wherein each of the plurality of the external connectors comprises a solder sheet, at least one ring terminal, and at least one screw that matches the least one of ring terminal, wherein the solder sheet is welded to the input terminal or the output terminal at one end, and the at least one ring terminal is movably adapted to another end of the solder sheet.

13. The multi-phase electromagnetic relay according to claim 11, wherein:

each of the plurality of the external connectors comprises at least one ring terminal and at least one screw that matches the least one of ring terminal, and a plurality of the ring terminals of the plurality of the plurality of external connectors are respectively movably adapted to the plurality of the external connection ends.

14. The multi-phase electromagnetic relay according to claim 9, further comprising a base, wherein:

the input terminal and the output terminal are respectively led out from two opposite sides of the base, and the external connection end is located outside the base.

15. The multi-phase electromagnetic relay according to claim 1, wherein:

the movable-static contact matching structure comprises a first static contact piece, a first static contact, a first movable contact piece, a first movable contact, a second static contact piece, a second static contact, a second movable contact piece, and a second movable contact, the first static contact is fixedly connected to one end of the first static contact piece and one end of the first movable contact piece, the first movable contact is fixedly connected to other end of the first movable contact piece, the second static contact is fixedly connected to one end of the second static contact piece and one end of the second movable contact piece, the second movable contact is fixedly connected to another end of the second movable contact piece, the first static contact cooperates with the second movable contact, the second static contact cooperates with the first movable contact, the first static contact piece is used as the input terminal, and the second static contact piece is used as the output terminal.

16. The multi-phase electromagnetic relay according to claim 15, wherein:

the first movable contact piece and the second movable contact piece are approximately parallel, the first movable contact piece and the second movable contact piece are respectively formed by a plurality of contact pieces stacked together, the first movable contact piece is provided with a first bending portion protruding toward the second movable contact piece, the second movable contact piece is provided with a second bending portion protruding toward the first movable contact piece, and the first bending portion and the second bending portion are disposed in a staggered manner.

17. The multi-phase electromagnetic relay according to claim 1, further comprising a base, wherein:

the input terminal and the output terminal are respectively led out from two opposite sides of the base, and the external connection end is located outside the base.

18. The multi-phase electromagnetic relay according to claim 17, wherein:

the multi-phase electromagnetic relay further comprising a magnetic circuit part and a push card, the base is divided into an upper layer and a lower layer by a partition located in a middle position in a thickness direction, the magnetic circuit part is installed on the upper layer of the base, the movable-static contact matching structure is installed on the lower layer of the base, the magnetic circuit part comprises an armature assembly, and the armature assembly is provided with a push arm, wherein the push arm passes through the partition to the lower layer of the base and is cooperated with movable contact piece of the movable-static contact matching structure through the push card.

19. The multi-phase electromagnetic relay according to claim 17, wherein:

the base is a cuboid comprising a first side wall and a second side wall oppositely arranged, and a third side wall connecting between the first side wall and the second side wall, the input terminal is led out perpendicular to the first side wall and extends in the direction toward the third side wall after bending, the output terminal is led out perpendicular to the second side wall and extends in the direction toward the third side wall after bending, and the plurality of the external connection ends are arranged in a row parallel to the third side wall.

20. The multi-phase electromagnetic relay according to claim 19, wherein:

a plurality of slots are respectively defined in the first side wall and the second side wall of the base, the plurality of movable-static contact matching structures each comprise a first static contact piece, a first static contact, a first movable contact piece, a first movable contact, a second static contact piece, a second static contact, a second movable contact piece, and a second movable contact, wherein:

the first static contact is fixedly connected to one end of the first static contact piece and one end of the first movable contact piece, the first movable contact is fixedly connected to another end of the first movable contact piece, the second static contact is fixedly connected to one end of the second static contact piece and one end of the second movable contact piece, the second movable contact is fixedly connected to another end of the second movable contact piece, the first static contact cooperates with the second movable contact, the second static contact cooperates with the first movable contact, the first static contact piece is used as the input terminal, and the second static contact piece is used as the output terminal, the first static contact pieces are respectively inserted in the slots of the first side wall, and one end of each of the first static contact pieces is closer to the first side wall than the second side wall;

the second static contact pieces are respectively inserted in the slots of the second side wall, and one end of each of the second static contact pieces is closer to the second side wall than the first side wall.

* * * * *